United States Patent
Kim et al.

(10) Patent No.: US 12,259,621 B2
(45) Date of Patent: Mar. 25, 2025

(54) LIQUID CRYSTAL DISPLAY DEVICE

(71) Applicant: LG DISPLAY CO., LTD., Seoul (KR)

(72) Inventors: Sang-Woon Kim, Paju-si (KR); Koog Choi, Paju-si (KR); Ji-Hoon Yu, Paju-si (KR); Hye-Ji Jeon, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/089,361

(22) Filed: Dec. 27, 2022

(65) Prior Publication Data

US 2023/0205024 A1    Jun. 29, 2023

(30) Foreign Application Priority Data

Dec. 28, 2021 (KR) .......................... 10-2021-0189587

(51) Int. Cl.
*G02F 1/1362* (2006.01)
*G02F 1/1339* (2006.01)
*G02F 1/1368* (2006.01)

(52) U.S. Cl.
CPC ...... *G02F 1/136222* (2021.01); *G02F 1/1339* (2013.01); *G02F 1/136209* (2013.01); *G02F 1/1368* (2013.01)

(58) Field of Classification Search
CPC ............ G02F 1/136222; G02F 1/1339; G02F 1/136209; G02F 1/1368; G02F 1/136286; G02F 1/136277; G02F 1/136218; G02F 1/1333; G02F 1/13356; G02F 1/133514; G02F 1/1362; G02F 2201/07; G02F 2202/02; G02F 2201/503
See application file for complete search history.

(56) References Cited

U.S. PATENT DOCUMENTS

| | | | | |
|---|---|---|---|---|
| 2003/0076572 A1* | 4/2003 | Kawase | ................ | G02B 5/201 359/254 |
| 2011/0187671 A1* | 8/2011 | Huang | ................. | G06F 3/0446 345/174 |
| 2013/0038569 A1* | 2/2013 | Kim | ...................... | G06F 3/0412 345/174 |
| 2015/0236047 A1* | 8/2015 | Kim | ...................... | H01L 27/124 438/30 |

(Continued)

FOREIGN PATENT DOCUMENTS

| CN | 101750776 A | * | 6/2010 | ....... G02F 1/133305 |
|---|---|---|---|---|
| CN | 104932767 B | * | 2/2018 | ............. G06F 3/041 |

(Continued)

OTHER PUBLICATIONS

Office Action dated Nov. 22, 2024 issued in Korean Patent Application No. 10-2021-0189587.

*Primary Examiner* — Hoan C Nguyen
(74) *Attorney, Agent, or Firm* — Morgan, Lewis & Bockius LLP

(57) ABSTRACT

A liquid crystal display device including a liquid crystal panel including a first substrate, a thin film transistor on the first substrate, an organic buffer layer between the first substrate and the thin film transistor, a second substrate, a color filter layer on the second substrate, and a liquid crystal layer between the first and second substrates, and a backlight unit below the liquid crystal panel. The second substrate is between the backlight unit and the first substrate.

27 Claims, 16 Drawing Sheets

(56) References Cited

U.S. PATENT DOCUMENTS

| | | | |
|---|---|---|---|
| 2015/0268503 A1* | 9/2015 | Son | G02F 1/1368 |
| | | | 438/30 |
| 2017/0047546 A1 | 2/2017 | Choi | |
| 2018/0143711 A1* | 5/2018 | Ono | G02F 1/13338 |
| 2019/0324309 A1* | 10/2019 | Tominaga | G09F 9/30 |
| 2021/0233941 A1* | 7/2021 | Chen | H01L 29/78675 |
| 2024/0153443 A1 | 5/2024 | Morita et al. | |

FOREIGN PATENT DOCUMENTS

| | | | | |
|---|---|---|---|---|
| JP | 2009003043 A | * | 1/2009 | |
| JP | 2019211688 A | | 12/2019 | |
| KR | 10-2007-0000888 A | | 1/2007 | |
| KR | 20080049346 A | * | 6/2008 | |
| KR | 10-2017-0019555 A | | 2/2017 | |
| KR | 10-2017-0114223 A | | 10/2017 | |
| KR | 10-1789161 B1 | | 11/2017 | |
| KR | 10-2020-0027800 A | | 3/2020 | |
| WO | 2018008619 A | | 1/2018 | |
| WO | WO-2019235147 A1 | * | 12/2019 | G09G 3/2003 |

* cited by examiner

LIQUID CRYSTAL DISPLAY DEVICE

CROSS-REFERENCE TO RELATED APPLICATION

The present application claims the benefit of and the priority to Korean Patent Application No. 10-2021-0189587 filed in Republic of Korea on Dec. 28, 2021, which is hereby incorporated by reference in its entirety for all purposes as if fully set forth herein.

BACKGROUND

1. Technical Field

The present disclosure relates to a liquid crystal display (LCD) device, and in particular, to a borderless LCD device with a narrow bezel.

2. Description of the Related Art

As the information society has developed, there are various demands for image display devices. Thus, flat panel display devices such as liquid crystal display (LCD) devices and organic light emitting diode (OLED) display devices have been developed and applied to various fields.

In particular, the LCD device, one of such display devices, has various technical advantages, such as lightweight, thin, and low power consumption, and is widely used.

The LCD device is configured to use optical anisotropy and dielectric anisotropy of a liquid crystal and includes two substrates, a liquid crystal layer between the two substrates, and pixel and common electrodes, which drive liquid crystal molecules in the liquid crystal layer. In the LCD device, orientations of the liquid crystal molecules are controlled by an electric field, which is produced by applying voltages to the pixel and common electrodes. This process is used to change optical transmittance in each pixel of the LCD device and consequently to display an image on the LCD device. The LCD device is applied to a wide range of devices, from portable devices, such as cellular phones, and multimedia devices to laptop computers or computer monitors, and large-scale televisions.

Electronic products with such LCD devices include a bezel region in addition to the display region for displaying images. Recently, various efforts have been made to provide borderless products to minimize a width of the bezel region (i.e., have a narrow bezel or maximize an area of the display region in a given area of the display device).

For example, a flip panel structure in which an array substrate is arranged adjacent to the display surface has been proposed. However, the array substrate includes a plurality of inorganic layers, which are easily cracked in response to an external impact. That is, the flip panel structure is vulnerable to problems such as low strength or panel damage.

Additionally, attempts have been made to reduce the weight and thickness of the LCD device by reducing the thickness of the substrate. However, this may make the LCD device more vulnerable to external impact and stress.

SUMMARY

Accordingly, the present disclosure is directed to an LCD device that substantially obviates one or more problems due to limitations and disadvantages of the related art.

An object of the present disclosure includes providing an LCD device that may have an improved mechanical strength or durability.

Additional features and advantages of the disclosure will be set forth in part in the description that follows, and in part will be apparent to those skilled in the art from the description or may be learned by practice of the inventive concepts provided herein. Other features and advantages of the inventive concepts may be realized and attained by the structure particularly pointed out in, or derivable from, the written description and claims as well as the appended drawings.

To achieve these and other advantages, and in accordance with the purpose of the present disclosure, as embodied and broadly described herein, a liquid crystal display device including a liquid crystal panel including a first substrate, a thin film transistor on the first substrate, an organic buffer layer between the first substrate and the thin film transistor, a second substrate, a color filter layer on the second substrate, and a liquid crystal layer between the first and second substrates, and a backlight unit below the liquid crystal panel. The second substrate is between the backlight unit and the first substrate.

It is to be understood that both the foregoing general description and the following detailed description of the present disclosure are merely by way of example and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain principles of the disclosure.

DETAILED DESCRIPTION OF THE ILLUSTRATED EMBODIMENTS

Figure 1:
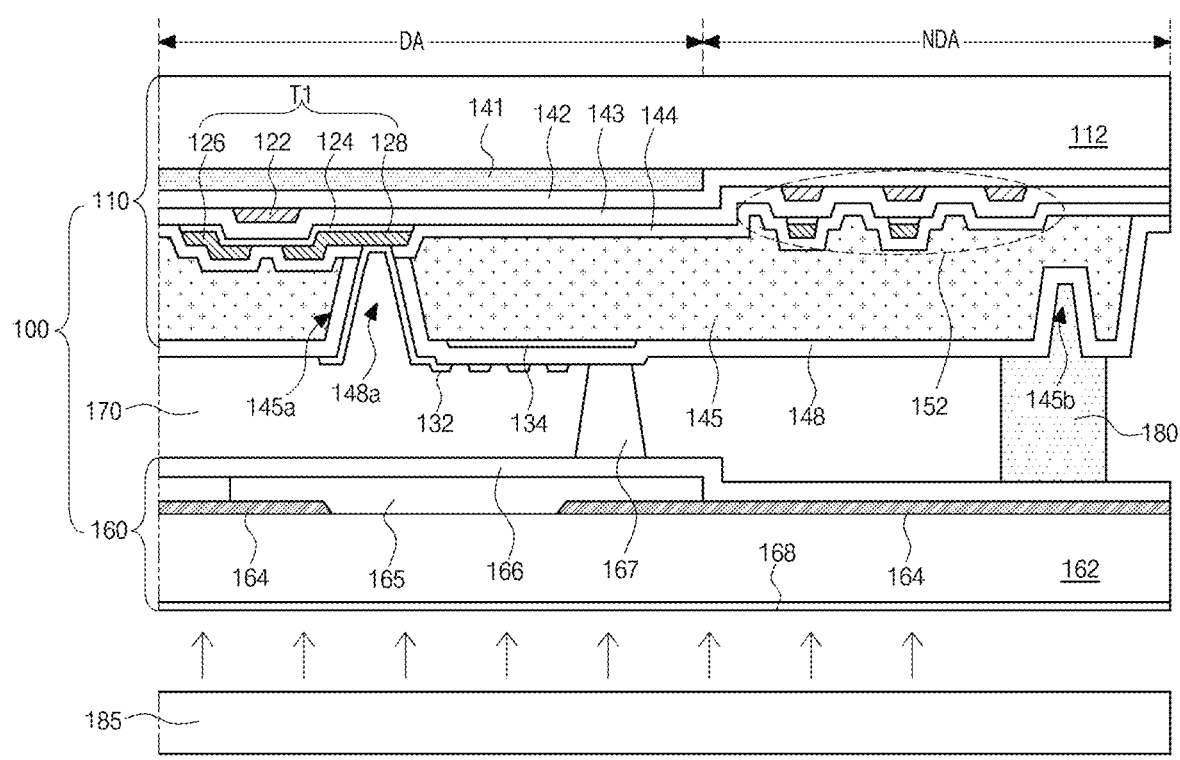
FIG. 1 illustrates a sectional view of an LCD device according to a first example embodiment of the present disclosure.

Reference will now be made in detail to some of the examples and embodiments of the disclosure illustrated in the accompanying drawings. Wherever possible, the same reference numbers will be used throughout the drawings to refer to the same or like parts.

Advantages and features of the present disclosure will become apparent with reference to the example embodiments described herein in detail together with the accompanying drawings. The present disclosure should not be construed as limited to the example embodiments as disclosed below, and may be embodied in various different forms. Thus, these example embodiments are set forth only to make the present disclosure sufficiently complete, and to assist those skilled in the art to fully understand the scope of the present disclosure. The protected scope of the present disclosure is defined by claims and their equivalents.

The shapes, sizes, ratios, angles, numbers, and the like, which are illustrated in the drawings to describe various example embodiments of the present disclosure, are merely given by way of example. Therefore, the present disclosure is not limited to the illustrations in the drawings. The same or similar elements are designated by the same reference numerals throughout the specification unless otherwise specified. Further, where the detailed description of the relevant known steps and elements may unnecessarily obscure an important point of the present disclosure, a detailed description of such known steps and elements may be omitted. Furthermore, in the following detailed description of the present disclosure, numerous specific details are set forth in order to provide a sufficiently thorough understanding of the present disclosure. However, it will be understood that the present disclosure may be practiced without these specific details. In other instances, known methods, procedures, components, and circuits have not been described in detail so as not to unnecessarily obscure aspects of the present disclosure.

The terminology used herein is to describe particular aspects and is not intended to limit the present disclosure. As used herein, the terms "a" and "an" used to describe an element in the singular form is intended to include a plurality of elements. An element described in the singular form is intended to include a plurality of elements, and vice versa, unless the context clearly indicates otherwise.

In the present specification, where the terms "comprise," "have," "include," and the like are used, one or more other elements may be added unless the term, such as "only," is used. As used herein, the term "and/or" includes a single associated listed item and any and all of the combinations of two or more of the associated listed items. An expression such as "at least one of" when preceding a list of elements may modify the entire list of elements and may not modify the individual elements of the list. The term "at least one" should be understood as including any and all combinations of one or more of the associated listed items. For example, the meaning of "at least one of a first element, a second element, and a third element" encompasses the combination of all three listed elements, combinations of any two of the three elements, as well as each individual element, the first element, the second element, and the third element.

In construing an element or numerical value, the element or the numerical value is to be construed as including an error or tolerance range even where no explicit description of such an error or tolerance range is provided.

In addition, it will also be understood that when a first element or layer is referred to as being present "on" a second element or layer, the first element may be disposed directly on the second element or may be disposed indirectly on the second element with a third element or layer being disposed between the first and second elements or layers. It will be understood that when an element or layer is referred to as being "connected to", or "coupled to" another element or layer, it may be directly connected to or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present. In the description of the various embodiments of the present disclosure, where positional relationships are described, for example, where the positional relationship between two parts is described using "on," "over," "under," "above," "below," "beside," "next," or the like, one or more other parts may be located between the two parts unless a more limiting term, such as "immediate(ly)," "direct(ly)," or "close(ly)" is used.

Further, as used herein, when a layer, film, region, plate, or the like may be disposed "on" or "on a top" of another layer, film, region, plate, or the like, the former may directly contact the latter or another layer, film, region, plate, or the like may be disposed between the former and the latter. As used herein, when a layer, film, region, plate, or the like is directly disposed "on" or "on a top" of another layer, film, region, plate, or the like, the former directly contacts the latter and another layer, film, region, plate, or the like is not disposed between the former and the latter. Further, as used herein, when a layer, film, region, plate, or the like may be disposed "below" or "under" another layer, film, region, plate, or the like, the former may directly contact the latter or another layer, film, region, plate, or the like may be disposed between the former and the latter. As used herein, when a layer, film, region, plate, or the like is directly disposed "below" or "under" another layer, film, region, plate, or the like, the former directly contacts the latter and another layer, film, region, plate, or the like is not disposed between the former and the latter.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The features of the various embodiments of the present disclosure may be partially or overall combined with each other, and may be variously inter-operated with each other and driven technically as those skilled in the art can sufficiently understand. The embodiments may be implemented independently of each other and may be implemented together in a co-dependent relationship.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments of the present disclosure will be described in detail with reference to the accompanying drawings. In adding reference numerals to elements of each of the drawings, although the same elements are illustrated in other drawings, like reference numerals may refer to like elements. Also, for convenience of description, a scale in which each of elements is illustrated in the accompanying drawings may differ from an actual scale. Thus, the illustrated elements are not limited to the specific scale in which they are illustrated in the drawings.

First Example Embodiment

FIG. 1 illustrates a sectional view of an LCD device according to a first example embodiment of the present disclosure.

As shown in FIG. 1, the LCD device according to the first example embodiment of the present disclosure may include a liquid crystal panel 100, which is configured to display an image, and a backlight unit 185, which is configured to provide light to the liquid crystal panel 100.

The liquid crystal panel 100 may include an array substrate 110, a color filter substrate 160, and a liquid crystal layer 170 between the two substrates 110 and 160. In addition, a display region DA, which is used to display an image, and a non-display region NDA, which is disposed around the display region DA, may be defined in the liquid crystal panel 100.

Here, the color filter substrate 160 may be placed between the array substrate 110 and the backlight unit 185.

The array substrate 110 may include a first substrate 112, an organic buffer layer 141, a thin film transistor T1, a pixel electrode 132, and a common electrode 134. The color filter substrate 160 may include a second substrate 162, a black matrix 164, a color filter layer 165, and an overcoat layer 166.

In detail, the display and non-display regions DA and NDA may be defined in the first substrate 112 of the array substrate 110 and the second substrate 162 of the color filter substrate 160. The first substrate 112 and the second substrate 162 may be formed of or may include at least one of glass and plastic materials. The first substrate 112 and the second substrate 162 may have a thickness of 0.5 mm or less, or 0.3 mm or less. But the inventive concept of the present disclosure is not limited to these example embodiments.

The organic buffer layer 141 may be formed on or disposed on an inner surface of the first substrate 112. The organic buffer layer 141 may be formed of or may include an organic insulating material and may be used as a buffering or impact-absorbing element that may be capable of improving the mechanical strength or durability of the liquid crystal panel 100. As an example, the organic buffer layer 141 may be formed of or may include polyimide (PI), polyamide (PA), photosensitive acrylic polymer (photo acryl), or benzocyclobutene (BCB). But the inventive concept of the present disclosure is not limited to these example embodiments.

The organic buffer layer 141 may be locally formed in or disposed in only the display region DA by forming the organic buffer layer 141 in the display and non-display regions DA and NDA through a coating method and then removing a portion of the organic buffer layer 141 from the non-display region NDA through a photo-etching process. However, the inventive concept of the present disclosure is not limited to this example embodiment. The organic buffer layer 141 may be placed in both the display and non-display regions DA and NDA.

The organic buffer layer 141 may have a thickness in a range of from 20 Å to 50 μm, from 50 Å to 20 μm, or from 300 Å to 1 μm.

An inorganic buffer layer 142 may be formed on or disposed on the organic buffer layer 141. The inorganic buffer layer 142 may be formed of or may include silicon nitride ($SiN_x$) or silicon oxide ($SiO_2$).

The inorganic buffer layer 142 may be placed in both the display and non-display regions DA and NDA. In the case where the organic buffer layer 141 is placed in only the display region DA, the inorganic buffer layer 142 may be in contact with the organic buffer layer 141 in the display region DA. The inorganic buffer layer 142 may be in contact with the first substrate 112 in the non-display region NDA. The inorganic buffer layer 142 may have a step difference near a boundary between the display and non-display regions DA and NDA.

The inorganic buffer layer 142 may prevent impurities or reduce the amount of impurities in the organic buffer layer 141 entering the thin film transistor T1. In addition, the inorganic buffer layer 142 may have a high adhesive strength to the first substrate 112 compared with the organic buffer layer 141. In this case, it may be possible to prevent or reduce the possibility of the organic buffer layer 141 detaching from the first substrate 112.

In the case where the organic buffer layer 141 is also placed in the non-display region NDA, the inorganic buffer layer 142 may be in contact with the organic buffer layer 141 in the non-display region NDA. However, the inventive concept of the present disclosure is not limited to this example embodiment. The inorganic buffer layer 142 may be omitted.

An inorganic buffer layer may be disposed between the first substrate 112 and the organic buffer layer 141.

Next, a gate electrode 122, which may be made of or may include a conductive material, may be formed on or disposed on the inorganic buffer layer 142 in the display region DA. The gate electrode 122 may be formed of or may include aluminum (Al), molybdenum (Mo), nickel (Ni), chromium (Cr), copper (Cu), neodymium (Nd), titanium (Ti), and/or alloys thereof. The gate electrode 122 may have a single- or multi-layered structure.

Although not shown, a gate line, which may be made of or may include the same material as the gate electrode 122, may be disposed on the inorganic buffer layer 142. The gate line may be extended in a first direction and may be connected to the gate electrode 122.

A gate insulating layer 143 may be formed on or disposed on the gate electrode 122 to cover the surface (e.g., substantially the entire surface) of the first substrate 112. Accordingly, the gate insulating layer 143 may be placed in both the display and non-display regions DA and NDA. The gate insulating layer 143 may be formed of or may include silicon nitride ($SiN_x$) or silicon oxide ($SiO_2$).

A semiconductor layer 124 may be formed on or disposed on the gate insulating layer 143 corresponding to the gate electrode 122. The semiconductor layer 124 may be formed of or may include an oxide semiconductor material. As an example, the semiconductor layer 124 may be formed of or may include indium gallium zinc oxide (IGZO). But the inventive concept of the present disclosure is not limited to this example embodiment. Here, an etch stop layer may be further formed on or disposed on the semiconductor layer 124 to correspond to the gate electrode 122.

Alternatively, the semiconductor layer 124 may be formed of or may include amorphous silicon. In this case, the semiconductor layer 124 may include an active layer, which may be made of or may include intrinsic amorphous silicon, and an ohmic contact layer, which may be made of or may include doped amorphous silicon. Here, the ohmic contact layer may be divided into two portions to expose a top surface of the active layer.

Next, source and drain electrodes 126 and 128, which may be made or may include a conductive material, may be formed on or disposed on the semiconductor layer 124. The source and drain electrodes 126 and 128 on the semiconductor layer 124 may be spaced apart from each other with the gate electrode 122 interposed therebetween. A portion of the semiconductor layer 124 between the source and drain electrodes 126 and 128 may be exposed (may not be covered by the source and drain electrodes 126 and 128).

In addition, although not shown, a data line, which may be made of or may include the same material as the source and drain electrodes 126 and 128, may be formed on or disposed on the gate insulating layer 143. The data line may be extended in a second direction to cross the gate line. In this case, a sub-pixel may be defined by the data line and the gate line. The data line may be connected to the source electrode 126.

The source and drain electrodes 126 and 128 may be formed of or may include aluminum (Al), molybdenum (Mo), nickel (Ni), chromium (Cr), copper (Cu), neodymium (Nd), titanium (Ti), and/or alloys thereof. The source and drain electrodes 126 and 128 may have a single- or multi-layered structure.

The gate electrode 122, the semiconductor layer 124, the source electrode 126, and the drain electrode 128 may constitute the thin film transistor T1. The exposed portion of the semiconductor layer 124 between the source and drain electrodes 126 and 128 may be used as a channel region of the thin film transistor T1.

Here, the semiconductor layer 124 and the source and drain electrodes 126 and 128 may be formed by a photo-etching process using a single mask. Accordingly, the semiconductor layer 124, except for the portion between the source and drain electrodes 126 and 128, may have substantially the same shape as the source and drain electrodes 126 and 128. Here, although not shown, a semiconductor pattern, which may be made of or may include the same material as the semiconductor layer 124, may be formed or disposed between the gate insulating layer 143 and the data line.

In an embodiment, the semiconductor layer 124 and the source and drain electrodes 126 and 128 may be formed by two photo-etching processes, which are separately performed using respective masks. In this case, a side surface of the semiconductor layer 124 may be covered with the source and drain electrodes 126 and 128. The semiconductor pattern between the gate insulating layer 143 and the data line may be omitted.

A protective layer 144, which may be made of or may include an insulating material, may be formed on or disposed on the source and drain electrodes 126 and 128. The protective layer 144 may be formed on or disposed on the surface (e.g., substantially the entire surface) of the first substrate 112. The protective layer 144 may be placed in both the display and non-display regions DA and NDA. The protective layer 144 may be formed of or may include an inorganic insulating material (e.g., silicon oxide ($SiO_2$) or silicon nitride ($SiN_x$)).

A planarization layer 145, which may be made of or may include an insulating material, may be formed on or disposed on the protective layer 144. The planarization layer 145 may be formed on or disposed on the surface (e.g., substantially the entire surface) of the first substrate 112. The planarization layer 145 may be placed in both the display and non-display regions DA and NDA.

The planarization layer 145 may be formed of or may include an organic insulating material. The planarization layer 145 may have a substantially flat top surface and may remove or reduce a step difference, which may be formed by underlying layers. As an example, the planarization layer 145 may be formed of or may include photo acryl that is photosensitive. Alternatively, the planarization layer 145 may be formed of or may include benzocyclobutene (BCB), polyimide (PI), or polyamide (PA). But the inventive concept of the present disclosure is not limited to these example embodiments.

The planarization layer 145 may have a first contact hole 145a, which is formed at or disposed at a position corresponding to a portion of the drain electrode 128. Here, a surface of the protective layer 144 facing the color filter substrate 160 may be partially exposed through the first contact hole 145a.

In addition, the planarization layer 145 may include or may be formed to have a groove 145b in the non-display region NDA. An edge portion of the planarization layer 145 may be removed to expose the surface of the protective layer 144 corresponding thereto.

The common electrode 134, which may be made of or may include a conductive material, may be formed on or disposed on the planarization layer 145. The common electrode 134 may be formed of or may include a transparent conductive material (e.g., indium tin oxide (ITO) or indium zinc oxide (IZO)).

A passivation layer 148, which may be made of or may include an insulating material, may be formed on or disposed on the common electrode 134. The passivation layer 148 may be formed of or may include an inorganic insulating material (e.g., silicon oxide ($SiO_2$) or silicon nitride ($SiN_x$)).

The passivation layer 148 may be formed on or disposed on the surface (e.g., substantially the entire surface) of the first substrate 112. The passivation layer 148 may be placed in both the display and non-display regions DA and NDA.

In the display region DA, the passivation layer 148 may be in contact with a side surface of the planarization layer 145 and may have a second contact hole 148a exposing the drain electrode 128. Here, the second contact hole 148a may also be formed in or disposed in the protective layer 144. Furthermore, in the non-display region NDA, the passivation layer 148 may be in contact with a side surface of the planarization layer 145 and the surface of the protective layer 144.

The pixel electrode 132, which may be made of or may include a conductive material, may be formed on or disposed on the passivation layer 148. The pixel electrode 132 may be disposed in each sub-pixel and may be formed of or may include a transparent conductive material (e.g., ITO or IZO).

The pixel electrode 132 may be in contact with the drain electrode 128 through the second contact hole 148*a*, which is formed in or disposed in the first contact hole 145*a*. In the present embodiment, the second contact hole 148*a* has been described to be separated from the first contact hole 145*a*. But the inventive concept of the present disclosure is not limited to this example embodiment. For example, the second contact hole 148*a* and the first contact hole 145*a* may form a single hole. In other words, a single contact hole to expose the drain electrode 128 may be disposed in the passivation layer 148, the planarization layer 145, and the protective layer 144. In this case, the pixel electrode 132 may be in contact with a side surface of the planarization layer 145.

The pixel electrode 132 may include a plurality of patterns and may be overlapped with the common electrode 134. Accordingly, when voltages are applied to the pixel electrode 132 and the common electrode 134, an electric field, which is substantially parallel to the first substrate 112, may be produced between the plurality of patterns of the pixel electrode 132 and the common electrode 134. In this case, liquid crystal molecules in the liquid crystal layer 170 may be driven by the electric field.

A plurality of driving lines 152 may be disposed in the non-display region NDA. The driving line 152 may include a plurality of patterns, which are formed in or disposed in the same layer and formed of or include the same material as the gate electrode 122 or the source and drain electrodes 126 and 128. The driving line 152 may include a signal line and a gate driving portion, which is provided in the form of gate-in-panel (GIP).

Here, the gate driving portion may be placed between the inorganic buffer layer 142 and the protective layer 144. The inorganic buffer layer 142 may have a step difference between the display region DA and the gate driving portion.

Next, the second substrate 162 may be disposed to be spaced apart from the first substrate 112. The black matrix 164 may be formed on or disposed on an inner surface of the second substrate 162. The black matrix 164 may be formed in or disposed in a region corresponding to a border of each sub-pixel in the display region DA and may be formed throughout the non-display region NDA. When viewed in a plan view, the black matrix 164 may have a lattice shape.

The black matrix 164 may be formed of or may include a black resin. Alternatively, the black matrix 164 may be formed of or may include an optically-reflective metal. In the case where the black matrix 164 is formed of or includes a metallic material, it may be possible to increase brightness of each pixel through the photon recycling. For example, light, which is emitted from the backlight unit 185, may be reflected by the black matrix 164. The reflected light may be reflected again by the backlight unit 185 to propagate toward the liquid crystal panel 100 and may be used to display an image. Thus, the brightness of the liquid crystal panel 100 may be increased, as described above.

The color filter layer 165 may be formed on or disposed on the black matrix 164 in the display region DA. The color filter layer 165 may include red, green, and blue color filters. Each of the color filters may correspond to one of the sub-pixels.

The overcoat layer 166, which may be made of or may include an insulating material, may be formed on or disposed on the color filter layer 165. The overcoat layer 166 may be formed on or disposed on the surface (e.g., substantially the entire surface) of the second substrate 162. The overcoat layer 166 may be placed in the display and non-display regions DA and NDA. In the non-display region NDA, the overcoat layer 166 may be in contact with the black matrix 164.

A column spacer 167, which may be made of or may include an insulating material, may be formed on or disposed on the overcoat layer 166. The column spacer 167 may be formed to correspond to the black matrix 164 in the display region DA and may be configured to maintain a cell gap between the array substrate 110 and the color filter substrate 160. The column spacer 167 may also be formed on or disposed on the array substrate 110.

In addition, an electrostatic discharging (ESD) prevention layer 168, which may be made of or may include a conductive material, may be formed on or disposed on an outer surface of the second substrate 162 to cover the surface (e.g., substantially the entire surface) of the second substrate 162. The ESD prevention layer 168 may be formed of or may include a transparent conductive material (e.g., ITO or IZO).

The liquid crystal layer 170 may be placed between the array substrate 110 and the color filter substrate 160. Although not shown, an alignment layer may be formed or disposed between the array substrate 110 and the liquid crystal layer 170 and between the color filter substrate 160 and the liquid crystal layer 170 to determine an initial alignment direction of liquid crystal molecules.

Next, a seal pattern 180 may be formed or disposed between the array substrate 110 and the color filter substrate 160, for example, in the non-display region NDA between the passivation layer 148 and the overcoat layer 166. The seal pattern 180 may enclose the display region DA and to prevent or reduce the possibility of the liquid crystal of the liquid crystal layer 170 leaking from the display region DA. The seal pattern 180 may be formed at or disposed at a position corresponding to the groove 145*b* of the planarization layer 145. In this case, a contact area between the seal pattern 180 and the array substrate 110 may be increased by the presence of the groove 145*b*.

Although not shown, an upper polarizing plate and a lower polarizing plate may be respectively disposed on the array substrate 110 and below the color filter substrate 160. In an example embodiment, the upper and lower polarizing plates may have transmission axes crossing each other.

The backlight unit 185 may be disposed below the liquid crystal panel 100 including the array substrate 110 and the color filter substrate 160. Here, the backlight unit 185 may be configured to send photons to the liquid crystal panel 100.

In the LCD device according to the first example embodiment of the present disclosure, the color filter substrate 160 may be placed between the array substrate 110 and the backlight unit 185. That is, the second substrate 162 may be placed between the first substrate 112 and the backlight unit 185. In this case, an outer surface of the first substrate 112 may serve as a display surface.

Thus, by reducing an area for connection between a driving portion, which is disposed in the array substrate 110, and an external circuit, it may be possible to reduce a width of a bezel region and thereby to realize a borderless LCD device, in which an area of the bezel region is minimized.

In addition, since the organic buffer layer 141 is disposed between the first substrate 112 of the array substrate 110 and the thin film transistor T1, the organic buffer layer 141 may be prevented from being cracked during a fabrication process or the possibility of cracking may be reduced during a fabrication process. Thus, it may be possible to improve the mechanical strength or durability of the liquid crystal panel 100.

Tables 1 and 2 show the mechanical strength characteristics of the liquid crystal panel of the LCD device according to example embodiments of the present disclosure. The tables, for example, show the test results obtained by changing a thickness of an organic buffer layer made of polyimide in ball-on-ring (BOR) and ball-drop (BD) tests. Table 1 shows the results when a 0.3-mm-thick glass substrate is used as the first and second substrates, and Table 2 shows the results when a 0.2-mm-thick glass substrate is used as the first and second substrates.

In the BOR test, a liquid crystal panel was placed on a ring-shaped jig having a diameter of 40 mm, and then, a metal ball probe having a diameter of 30 mm was used to exert a force on the liquid crystal panel until the liquid crystal panel was cracked. A force, which was applied when the liquid crystal panel was cracked, was measured as the mechanical strength of the liquid crystal panel, and the maximum value of the applied force was 90 kgf. In the BD test, a position of a 22 g metal ball from a liquid crystal panel was changed until a liquid crystal panel was cracked by free-falling of the 22 g metal ball, and when the liquid crystal panel was cracked, the position of the metal ball was measured. The highest position of the metal ball was 1400 mm.

TABLE 1

|  | Comparative Example 1 | Experimental Example 1 | Experimental Example 2 | Experimental Example 3 |
|---|---|---|---|---|
| PI thickness | 0 μm | 16 μm | 4 μm | 0.33 μm |
| BOR test | 8~10 kgf | 85 kgf or more | 90 kgf or more | 83 kgf |
| BD test | 260~350 mm | 1400 mm or more | 1400 mm or more | 1400 mm or more |

TABLE 2

|  | Comparative Example 2 | Experimental Example 4 | Experimental Example 5 |
|---|---|---|---|
| PI thickness | 0 μm | 4 μm | 0.33 μm |
| BOR test | 6 kgf | 90 kgf or more | 83 kgf |
| BD test | 150~175 mm | 1100 mm or more | 1400 mm or more |

As shown in Tables 1 and 2, the mechanical durability of the liquid crystal panel is improved when an organic buffer layer is disposed between the first substrate of the array substrate and the thin film transistor.

There is an increasing demand for an LCD device including a touch screen, which is configured to receive commands from a user while images are displayed on the liquid crystal panel. For example, some LCD devices are being developed to include an in-cell type touch screen, in which a touch electrode and a touch line constituting a touch panel are integrated as a part of the array substrate of the liquid crystal panel. A liquid crystal panel, which includes a touch electrode and a touch line according to a second example embodiment of the present disclosure, will be described in more detail with reference to FIGS. 2 to 5.

Second Example Embodiment

Figure 2:
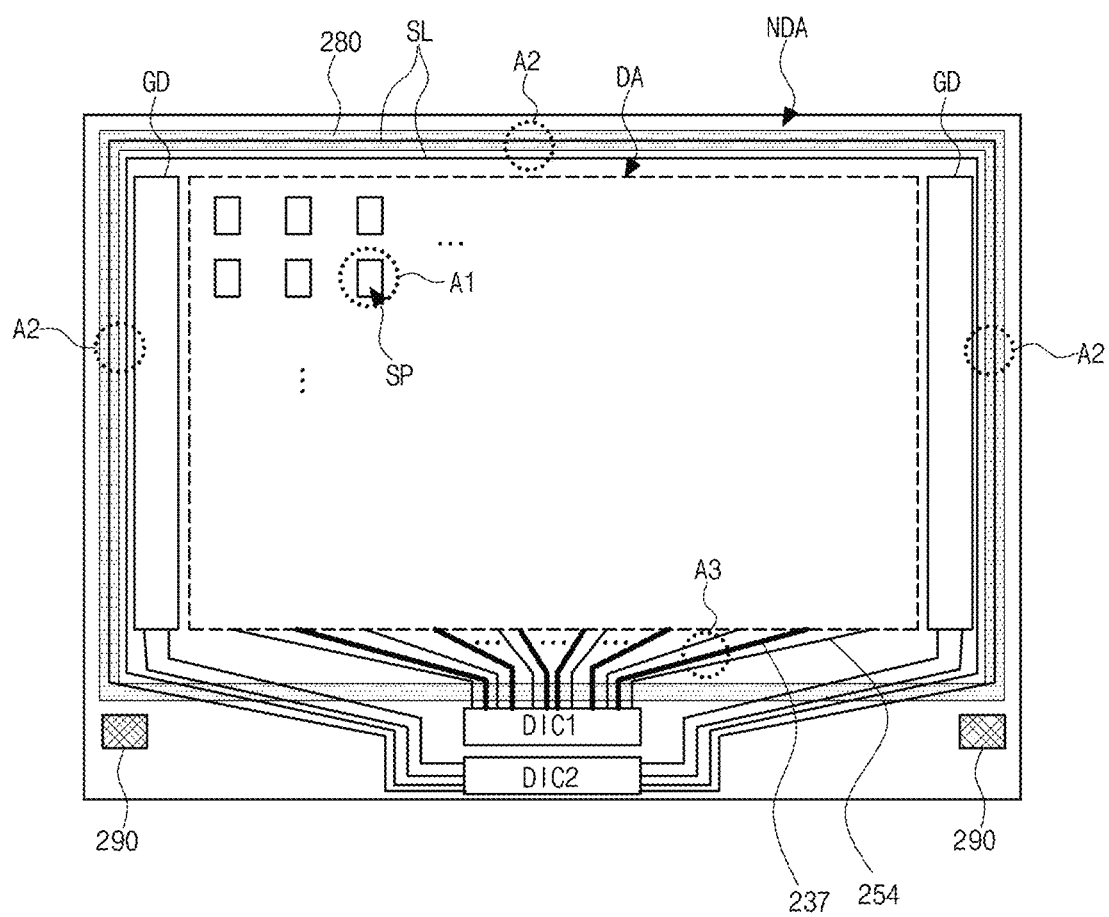
FIG. 2 illustrates a plan view of a liquid crystal panel of an LCD device according to a second example embodiment of the present disclosure.

FIG. 2 illustrates a plan view of a liquid crystal panel of an LCD device according to a second example embodiment of the present disclosure.

As shown in FIG. 2, the liquid crystal panel of the LCD device according to the second example embodiment of the present disclosure may include the display region DA, which is used to display an image, and the non-display region NDA, which is provided to enclose the display region DA.

In the display region DA, a plurality of sub-pixels SP may be arranged in a matrix shape. Each of the sub-pixels SP may be configured to receive signals through a gate line (not shown), a data line (not shown), and a power line (not shown). Each of the sub-pixels SP may include a thin film transistor and a liquid crystal capacitor, and a detailed structure of the sub-pixel SP will be described in more detail below.

In addition, a touch line (not shown) may be disposed in the display region DA and may be used to deliver a touch driving voltage and a touch sensing voltage.

A gate driving portion GD and first and second driving portions DIC1 and DIC2 may be disposed in the non-display region NDA to generate signals or to receive signals from an external driving printed circuit board (PCB) and apply signals to each of the sub-pixels SP in the display region DA.

The gate driving portion GD may be respectively disposed in left and right portions of the non-display region NDA shown in FIG. 2 and may include a plurality of switching devices and a plurality of interconnection lines. The gate driving portion GD may be configured to generate a gate signal and to apply the gate signal to the gate line. In an example embodiment, the gate driving portion GD may be formed on or disposed on the same substrate as the thin film transistor in the display region DA or may be provided in the form of GIP.

The first and second driving portions DIC1 and DIC2 may be placed in a lower portion of the non-display region NDA shown in FIG. 2 and may be provided in the form of an integrated circuit (IC).

The first driving portion DIC1 may generate a data signal and then may output the data signal to the data line. In addition, the first driving portion DIC1 may be configured to apply the touch driving voltage to the touch line and receive the touch sensing voltage from the touch electrode through the touch line.

The second driving portion DIC2 may be connected to the gate driving portion GD and a signal line SL to deliver a power voltage and a control signal, which may be required to operate the LCD device.

Furthermore, a plurality of signal lines SL, at least one data link line 254, and at least one touch link line 237 may be disposed in the non-display region NDA.

The plurality of signal lines SL may include a common line and a test line, which are used to deliver a common voltage and a test voltage to the display region DA. The plurality of signal lines SL may enclose the display region DA.

The data link line 254 may be disposed in the lower portion of the non-display region NDA to connect the data line in the display region DA to the first driving portion DIC1. The touch link line 237 may be disposed in the lower portion of the non-display region NDA to connect the touch line in the display region DA to the first driving portion DIC1.

A seal pattern 280 may be formed in or disposed in the non-display region NDA to enclose the display region DA. In this case, it may be possible to prevent or reduce the possibility of the liquid crystal of the liquid crystal layer leaking from the display region DA. Here, the gate driving portion GD may be placed in a region, which is located inside the seal pattern 280 (i.e., toward a center of the liquid crystal panel) (e.g., between the seal pattern 280 and the display region DA). The first and second driving portions DIC1 and DIC2 may be placed in a region, which is located outside the seal pattern 280. That is, the seal pattern 280 may be placed between the display region DA and the first and second driving portions DIC1 and DIC2.

Furthermore, at least one of the signal lines SL may be overlapped with the seal pattern 280. The data link line 254 and the touch link line 237 may cross the seal pattern 280.

Silver (Ag) dots 290 may be disposed in opposite ends of the lower portion of the non-display region NDA. The silver dot 290 may be formed by applying a metal paste using a dotting method and may connect the ESD prevention layer of the color filter substrate to a pad of the array substrate. In this case, an electrostatic current, which may be produced in the color filter substrate, may be discharged to the outside through the silver dot 290.

Figure 3:
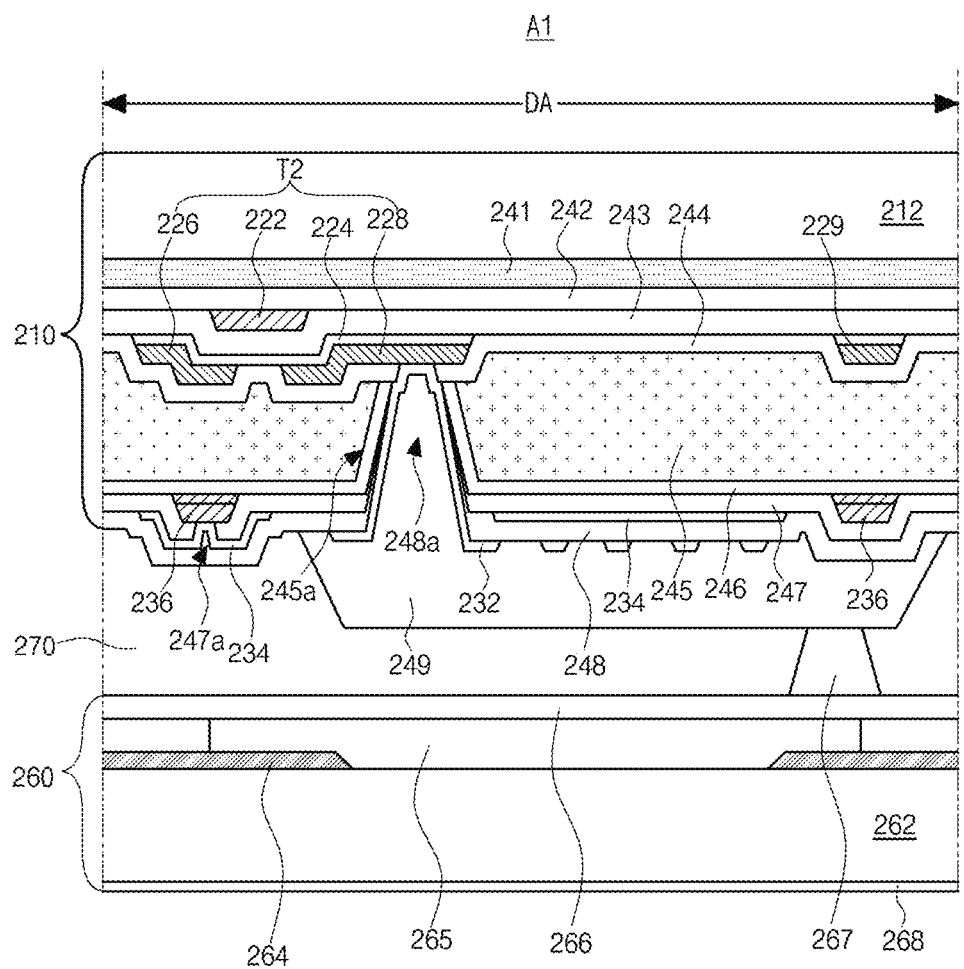
FIG. 3 illustrates a sectional view of a sub-pixel of the liquid crystal panel of the LCD device according to the second example embodiment of the present disclosure.
Figure 4:
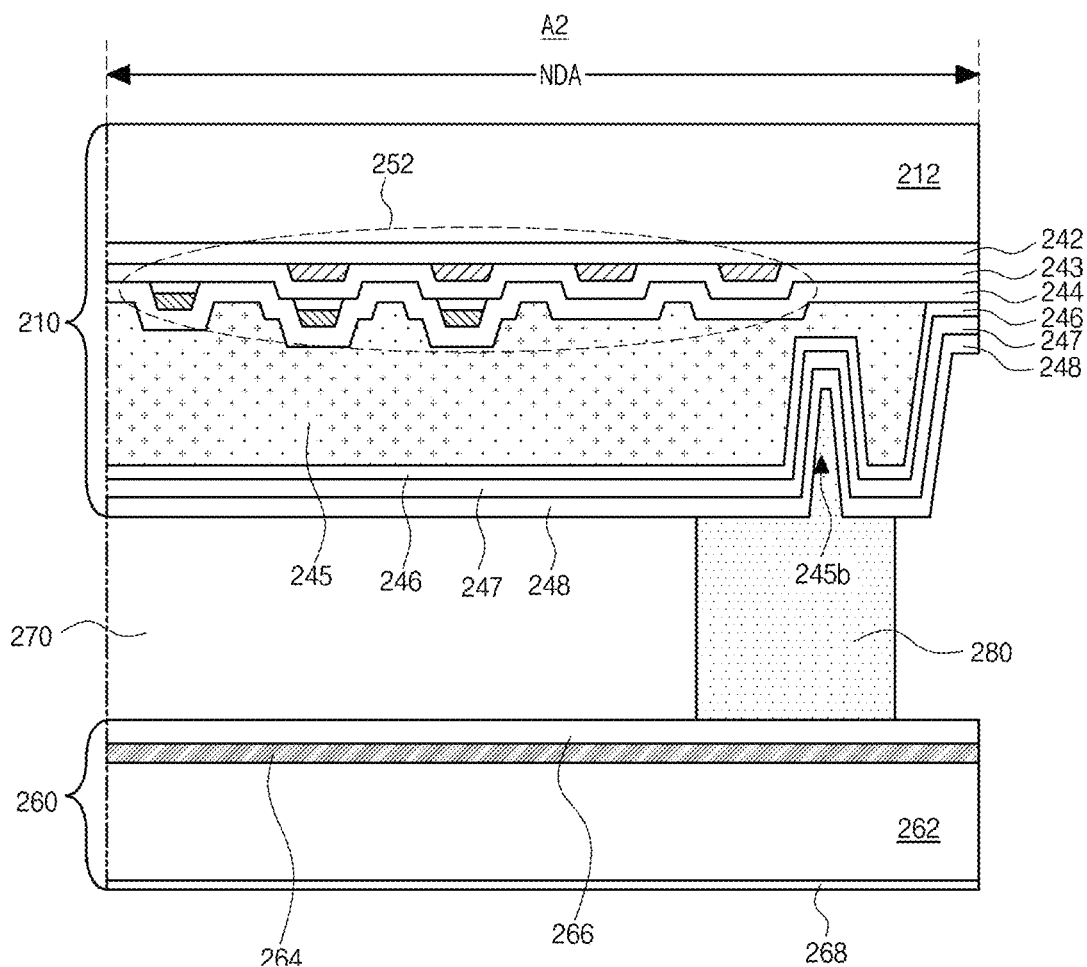
FIG. 4 illustrates a sectional view of a gate driving portion of the liquid crystal panel of the LCD device according to the second example embodiment of the present disclosure.
Figure 5:
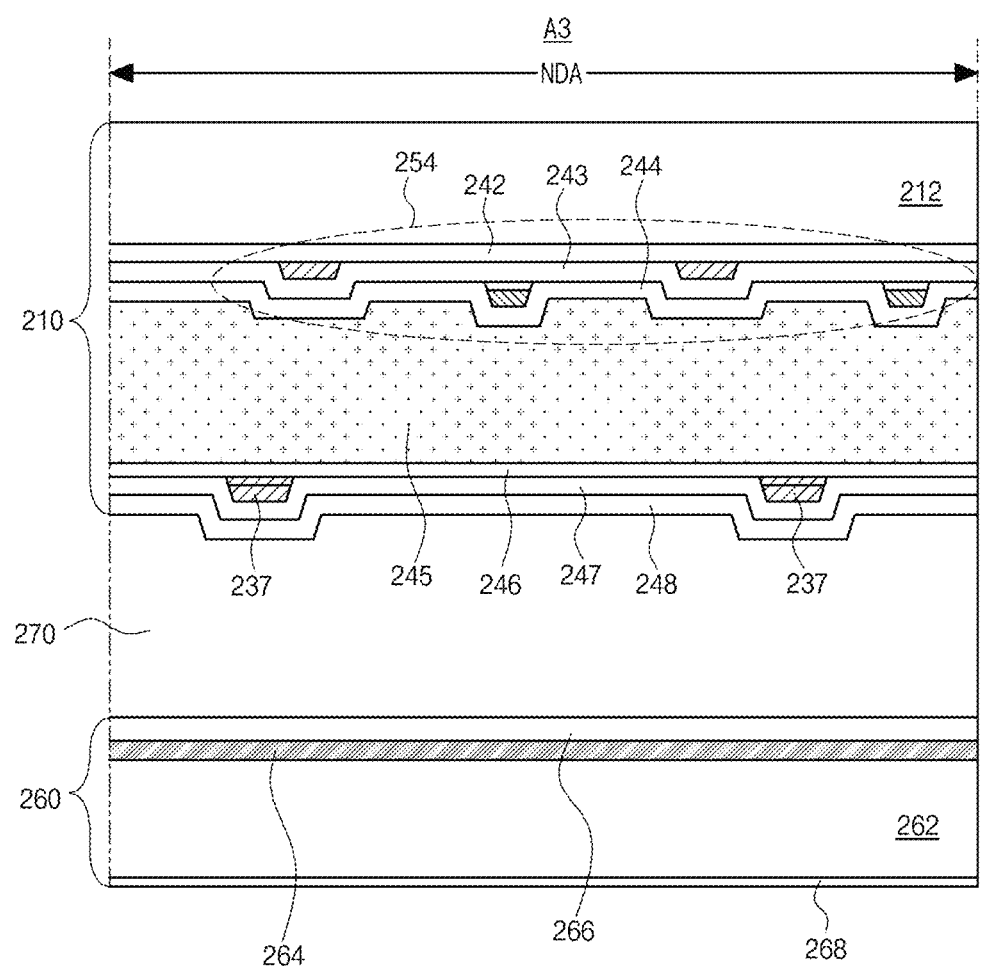
FIG. 5 illustrates a sectional view of a link portion of the liquid crystal panel of the LCD device according to the second example embodiment of the present disclosure.

A sectional structure of the liquid crystal panel of the LCD device according to the second example embodiment of the present disclosure will be described with reference to FIGS. 3 to 5. FIG. 3 illustrates a sectional view of a sub-pixel of the liquid crystal panel of the LCD device according to the second example embodiment of the present disclosure. For example, FIG. 3 illustrates a sectional structure of a region 'A1' corresponding to the sub-pixel of the display region of an example embodiment illustrated in FIG. 2. FIG. 4 illustrates a sectional view of a gate driving portion of the liquid crystal panel of the LCD device according to the second example embodiment of the present disclosure. For example, FIG. 4 illustrates a sectional structure of a region 'A2' corresponding to the gate driving portion in the non-display region of an example embodiment illustrated in FIG. 2. FIG. 5 illustrates a sectional view of a link portion of the liquid crystal panel of the LCD device according to the second example embodiment of the present disclosure. For example, FIG. 5 illustrates a sectional structure of a region 'A3' corresponding to the link portion in the non-display region of an example embodiment illustrated in FIG. 2.

Except for structural differences associated with a touch line, a buffer layer, and a touch insulating layer, the liquid crystal panel of the LCD device according to the second example embodiment of the present disclosure may be configured to have substantially the same structure as that in the first example embodiment. To avoid repeating an overlapping description, the same elements as in the first example embodiment will be identified by the same reference numbers.

As shown in FIGS. 3, 4, and 5, the liquid crystal panel of the LCD device according to the second example embodiment of the present disclosure may include an array substrate 210, a color filter substrate 260, and a liquid crystal layer 270 between the two substrates 210 and 260. The color filter substrate 260 may be positioned between the array substrate 210 and a backlight unit (not shown).

The array substrate 210 may include a first substrate 212, an organic buffer layer 241, a thin film transistor T2, a pixel electrode 232, a common electrode 234, and a touch line 236. The color filter substrate 260 may include a second substrate 262, a black matrix 264, a color filter layer 265, and an overcoat layer 266.

In detail, the display and non-display regions DA and NDA may be defined in the first substrate 212 of the array substrate 210 and the second substrate 262 of the color filter substrate 260. The first substrate 212 and the second substrate 262 may be formed of or may include at least one of glass and plastic materials.

The organic buffer layer 241 may be formed on or disposed on an inner surface of the first substrate 212. The organic buffer layer 241 may be formed of or may include an organic insulating material and may be placed in the display region DA. As an example, the organic buffer layer 241 may be formed of or may include polyimide (PI), polyamide (PA), photo acryl, or benzocyclobutene (BCB). But the inventive concept of the present disclosure is not limited to these example embodiments.

The organic buffer layer 241 may have a thickness in a range of from 20 Å to 50 μm, from 50 Å to 20 μm, or from 300 Å to 1 μm.

An inorganic buffer layer 242 may be formed on or disposed on the organic buffer layer 241. The inorganic buffer layer 242 may be formed on or disposed on the surface (e.g., substantially the entire surface) of the first substrate 212. The inorganic buffer layer 242 may be placed in both the display and non-display regions DA and NDA. The inorganic buffer layer 242 may be formed of or may include silicon nitride ($SiN_x$) or silicon oxide ($SiO_2$).

The inorganic buffer layer 242 may be in contact with the organic buffer layer 241 in the display region DA. The inorganic buffer layer 242 may be in contact with the first substrate 212 in the non-display region NDA. The inorganic buffer layer 242 may have a step difference near a boundary between the display and non-display regions DA and NDA.

Next, a gate electrode 222, which may be made of or may include a conductive material, may be formed on or disposed on the inorganic buffer layer 242 in the display region DA.

A gate insulating layer 243, which may be made of or may include an inorganic insulating material, may be formed on or disposed on the gate electrode 222. The gate insulating layer 243 may be placed in both the display and non-display regions DA and NDA.

A semiconductor layer 224 may be formed on or disposed on the gate insulating layer 243 corresponding to the gate electrode 222. The semiconductor layer 224 may be formed of or may include an oxide semiconductor material. Alternatively, the semiconductor layer 224 may be formed amorphous silicon.

Next, source and drain electrodes 226 and 228, which are formed of or include a conductive material, may be formed on or disposed on the semiconductor layer 224.

The gate electrode 222, the semiconductor layer 224, the source electrode 226, and the drain electrode 228 may constitute the thin film transistor T2.

A data line 229, which may be made of or may include the same material as the source and drain electrodes 226 and 228, may be formed on or disposed on the gate insulating layer 243. In addition, a semiconductor pattern, which may be made of or may include the same material as the semiconductor layer 224, may be formed or disposed between the gate insulating layer 243 and the data line 229.

A protective layer 244, which may be made of or may include an inorganic insulating material, may be formed on or disposed on the source and drain electrodes 226 and 228. The protective layer 244 may be placed in both the display and non-display regions DA and NDA.

A planarization layer 245, which may be made of or may include an organic insulating material, may be formed on or disposed on the protective layer 244. The planarization layer 245 may be placed in both the display and non-display regions DA and NDA. The planarization layer 245 may have a flat top surface.

The planarization layer 245 may have a first contact hole 245a, which is formed at or disposed at a position corresponding to a portion of the drain electrode 228. Here, the first contact hole 245a may be expose a portion of a surface of the protective layer 244 facing the color filter substrate 260.

Furthermore, the planarization layer 245 may have a groove 245b in the non-display region NDA. An edge portion of the planarization layer 245 may be removed to expose the surface of the protective layer 244 corresponding thereto.

A buffer layer 246, which may be made of or may include an insulating material, may be formed on or disposed on the planarization layer 245. The buffer layer 246 may be formed on or disposed on the surface (e.g., substantially the entire surface) of the first substrate 212. The buffer layer 246 may be placed in both the display and non-display regions DA and NDA. In the display region DA, the buffer layer 246 may be in contact with a side surface of the planarization layer 245. Furthermore, in the non-display region NDA, the buffer layer 246 may be in contact with a side surface of the planarization layer 245 and the surface of the protective layer 244. The buffer layer 246 may be formed of or may include an inorganic insulating material (e.g., silicon oxide ($SiO_2$) or silicon nitride ($SiN_x$)).

The touch line 236, which may be made of or may include a conductive material, may be formed on or disposed on the buffer layer 246. The touch line 236 may be overlapped with the data line 229. The touch line 236 may be formed of or may include aluminum (Al), molybdenum (Mo), nickel (Ni), chromium (Cr), copper (Cu), neodymium (Nd), titanium (Ti), and/or alloys thereof. For example, the touch line 236 may have a double-layered structure including molybdenum titanium (MoTi) and copper (Cu) layers. However, the inventive concept of the present disclosure is not limited to these example embodiments. For example, in an embodiment, the touch line 236 may have a single- or triple-layered structure.

A touch insulating layer 247, which may be made of or may include an insulating material, may be formed on or disposed on the touch line 236. The touch insulating layer 247 may be formed on or disposed on the surface (e.g., substantially the entire surface) of the first substrate 212. The touch insulating layer 247 may be placed in both the display and non-display regions DA and NDA. The touch insulating layer 247 may be formed of or may include an inorganic insulating material (e.g., silicon oxide ($SiO_2$) or silicon nitride ($SiN_x$)).

The touch insulating layer 247 may have a touch contact hole 247a to expose the touch line 236.

The common electrode 234 may be formed on or disposed on the touch insulating layer 247. The common electrode 234 may be formed of or may include a transparent conductive material (e.g., ITO or IZO). The common electrode 234 may be in contact with the touch line 236 through the touch contact hole 247a. The common electrode 234 may be patterned to include a plurality of patterns, which are separately disposed in respective touch blocks, and may be used as a touch electrode of receiving a touch driving voltage through the touch line 236 and transmitting a touch sensing voltage to the touch line 236.

A passivation layer 248, which may be made of or may include an inorganic insulating material, may be formed on or disposed on the common electrode 234. The passivation layer 248 may be placed in both the display and non-display regions DA and NDA.

In the display region DA, the passivation layer 248 may have a second contact hole 248a to expose the drain electrode 228. Here, the second contact hole 248a may be formed in or disposed in not only the touch insulating layer 247 but also the buffer and protective layers 246 and 244.

The pixel electrode 232, which may be made of or disposed include a conductive material, may be formed on or disposed on the passivation layer 248. The pixel electrode 232 may be formed of or may include a transparent conductive material (e.g., ITO or IZO).

The pixel electrode 232 may include a plurality of patterns and may be overlapped with the common electrode 234. The pixel electrode 232 may be in contact with the drain electrode 228 through the second contact hole 248a, which is formed in or disposed in the first contact hole 245a.

In the present embodiment, the second contact hole 248a has been described to be separated from the first contact hole 245a. But in an embodiment of the present disclosure, the second contact hole 248a and the first contact hole 245a may form a single hole.

A bump 249 may be formed on or disposed on the pixel electrode 232. The bump 249 may be formed of or may include an organic insulating material. As an example, the bump 249 may be formed of or may include photo acryl, benzocyclobutene (BCB), polyimide (PI), or polyamide (PA). But the inventive concept of the present disclosure is not limited to these example embodiments. In an embodiment, the bump 249 may be omitted.

A plurality of driving lines 252, at least one data link line 254, and at least one touch link line 237 may be disposed in the non-display region NDA.

The driving line 252 may include a plurality of patterns, which are formed in or disposed in the same layer and formed of or include the same material as the gate electrode 222 or the source and drain electrodes 226 and 228. The driving line 252 may include a common line, a test line, and a gate driving portion, which is provided in the form of GIP.

Here, the gate driving portion may be placed between the inorganic buffer layer 242 and the protective layer 244. The inorganic buffer layer 242 may have a step difference between the display region DA and the gate driving portion.

The data link line 254 may include a plurality of patterns, which are formed in or disposed in the same layer as the gate electrode 222 or the source and drain electrodes 226 and 228 and are formed of or include the same material as the gate electrode 222 or the source and drain electrodes 226 and 228, and may be connected to a data line 329 in the display region DA.

Furthermore, the touch link line 237 may be formed in or disposed in the same layer. The touch link line 237 may be formed of or may include the same material as the touch line 236 in the display region DA. The touch link line 237 may be connected to the touch line 236.

Next, the second substrate 262 may be disposed to be spaced apart from the first substrate 212. The black matrix 264 may be formed on or disposed on an inner surface of the second substrate 262. The black matrix 264 may be formed in or disposed in a region corresponding to a border of each sub-pixel in the display region DA and may be formed throughout the non-display region NDA.

The black matrix 264 may be formed of or may include a black resin. Alternatively, the black matrix 264 may be formed of or may include an optically-reflective metal.

The color filter layer 265 may be formed on or disposed on the black matrix 264 in the display region DA. The color filter layer 265 may include red, green, and blue color filters. Here, each of the color filters may correspond to one of the sub-pixels.

The overcoat layer 266, which may be made of or may include an insulating material, may be formed on or disposed on the color filter layer 265. The overcoat layer 266 may be placed in the display and non-display regions DA and NDA. In the non-display region NDA, the overcoat layer 266 may be in contact with the black matrix 264.

A column spacer 267, which may be made of or may include an insulating material, may be formed on or disposed on the overcoat layer 266. The column spacer 267 may be formed to or disposed to correspond to the black matrix 264 of the display region DA. The column spacer 267 may be configured to maintain a cell gap between the array substrate 210 and the color filter substrate 260. The column spacer 267 may be formed at or disposed at a position corresponding to the bump 249 of the array substrate 210 and may be in contact with the bump 249.

In addition, an ESD prevention layer 268, which may be made of or may include a transparent conductive material (e.g., ITO or IZO), may be formed on or disposed on an outer surface of the second substrate 262 to cover the surface (e.g., substantially the entire surface) of the second substrate 262.

The liquid crystal layer 270 may be placed between the array substrate 210 and the color filter substrate 260.

Furthermore, the seal pattern 280 may be formed or disposed between the array substrate 210 and the color filter substrate 260, for example, in the non-display region NDA between the passivation layer 248 and the overcoat layer 266. The seal pattern 280 may be formed to enclose the display region DA and to prevent or reduce the possibility of the liquid crystal of the liquid crystal layer 270 leaking. The seal pattern 280 may be formed at or disposed at a position corresponding to the groove 245b of the planarization layer 245. In this case, a contact area between the seal pattern 280 and the array substrate 210 may be increased by the groove 245b.

Although not shown, a backlight unit (not shown) may be disposed below the color filter substrate 260 and may be configured to send photons to the liquid crystal panel.

In the LCD device according to the second example embodiment of the present disclosure, it may be possible to realize a touch screen in an integrated form by providing the touch line 236 in the first substrate 212 of the array substrate 210 and connecting the touch line 236 to the touch electrode (e.g., the common electrode 234).

The structure of the touch line and the touch electrode may be changed. Such a liquid crystal panel according to a third example embodiment of the present disclosure will be described in more detail with reference to FIGS. 6 to 9.

Third Example Embodiment

Figure 6:
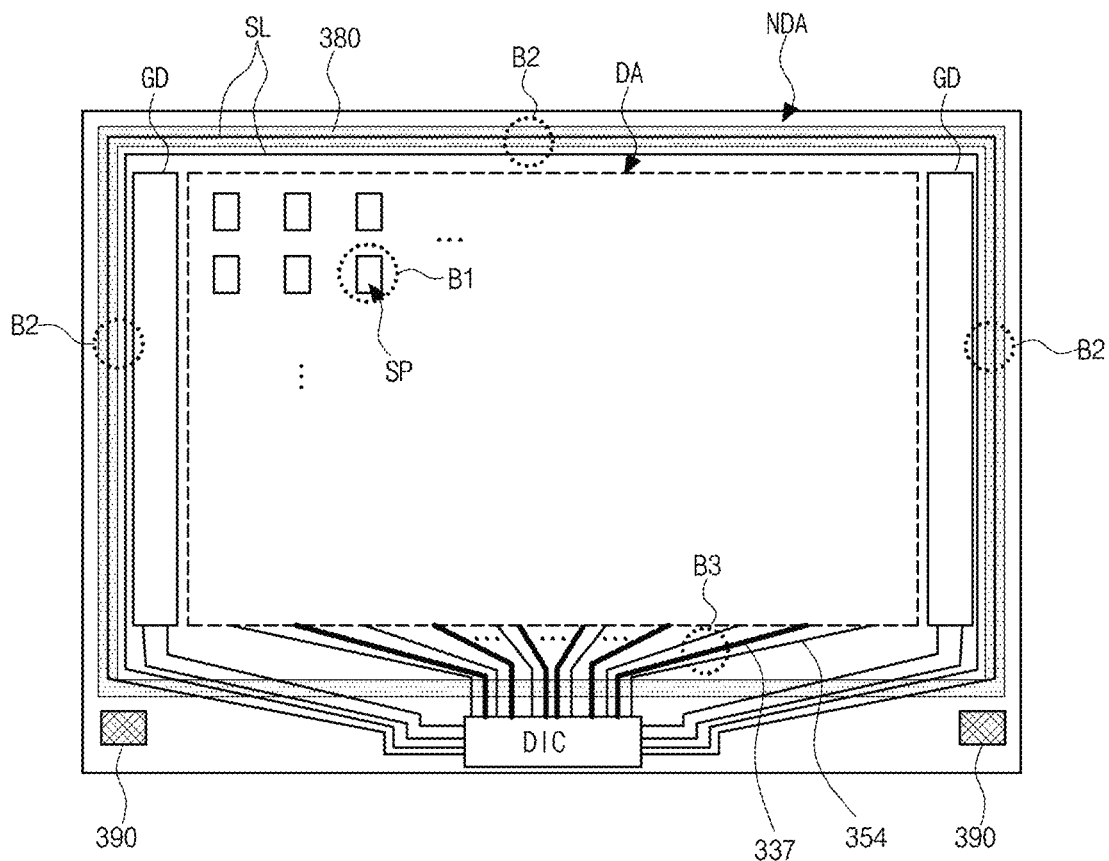
FIG. 6 illustrates a plan view of a liquid crystal panel of an LCD device according to a third example embodiment of the present disclosure.

FIG. 6 illustrates a plan view of a liquid crystal panel of an LCD device according to a third example embodiment of the present disclosure.

As shown in FIG. 6, the liquid crystal panel of the LCD device according to the third example embodiment of the present disclosure may include the display region DA, which is used to display an image, and the non-display region NDA, which is disposed to enclose the display region DA.

In the display region DA, a plurality of sub-pixels SP may be arranged in a matrix shape. Each of the sub-pixels SP may be configured to receive signals through a gate line (not shown), a data line (not shown), and a power line (not shown). Each of the sub-pixels SP may include a thin film transistor and a liquid crystal capacitor, and a detailed structure of the sub-pixel SP will be described in more detail below.

In addition, a touch line (not shown) may be disposed in the display region DA and may be used to deliver a touch driving voltage and a touch sensing voltage.

The gate driving portion GD and a touch display driving portion DIC may be disposed in the non-display region NDA to generate signals or to receive signals from an external driving printed circuit board (PCB) and/or to apply signals to each of the sub-pixels SP in the display region DA.

The gate driving portion GD may be disposed in left and right portions of the non-display region NDA shown in FIG. 6 and may include a plurality of switching devices and a plurality of interconnection lines. The gate driving portion GD may be configured to generate a gate signal and to apply the gate signal to the gate line. In an example embodiment, the gate driving portion GD may be formed on or disposed on the same substrate as the thin film transistor in the display region DA or may be provided in the form of GIP.

The touch display driving portion DIC may be placed in a lower portion of the non-display region NDA shown in FIG. 6 and may be provided in the form of an integrated circuit (IC).

The touch display driving portion DIC may be configured to generate a data signal and apply the data signal to the data line, to apply the touch driving voltage to the touch line, and to receive the touch sensing voltage, which is transmitted from the touch electrode through the touch line. Furthermore, the touch display driving portion DIC may be connected to the gate driving portion GD and the signal line SL to deliver a power voltage and a control signal, which may be required to operate the LCD device.

In addition, a plurality of signal lines SL, at least one data link line 354, and at least one touch link line 337 may be disposed in the non-display region NDA.

The plurality of signal lines SL may include a common line and a test line, which are used to deliver a common voltage and a test voltage to the display region DA, and may enclose the display region DA.

The data link line 354 may be disposed in the lower portion of the non-display region NDA to connect the data line in the display region DA to the touch display driving portion DIC. The touch link line 337 may be disposed in the lower portion of the non-display region NDA to connect the touch line in the display region DA to the touch display driving portion DIC.

A seal pattern 380 may be formed in or disposed in the non-display region NDA to enclose the display region DA. In this case, it may be possible to prevent or reduce the possibility of the liquid crystal of the liquid crystal layer leaking from the display region DA. Here, the gate driving portion GD may be placed in a region, which is located inside the seal pattern 380 (e.g., between the seal pattern 380 and the display region DA). The touch display driving portion DIC may be placed in a region, which is located outside the seal pattern 380. That is, the seal pattern 380 may be placed between the display region DA and the touch display driving portion DIC.

Furthermore, at least one of the signal lines SL may be overlapped with the seal pattern 380. The data link line 354 and the touch link line 337 may cross the seal pattern 380.

Silver dots 390 may be disposed in opposite ends of the lower portion of the non-display region NDA. The silver dot 390 may be formed by applying a metal paste using a dotting method and may connect the ESD prevention layer of the color filter substrate to a pad of the array substrate. In this case, an electrostatic current, which may be produced in the color filter substrate, may be discharged to the outside through the silver dot 390.

Figure 7:
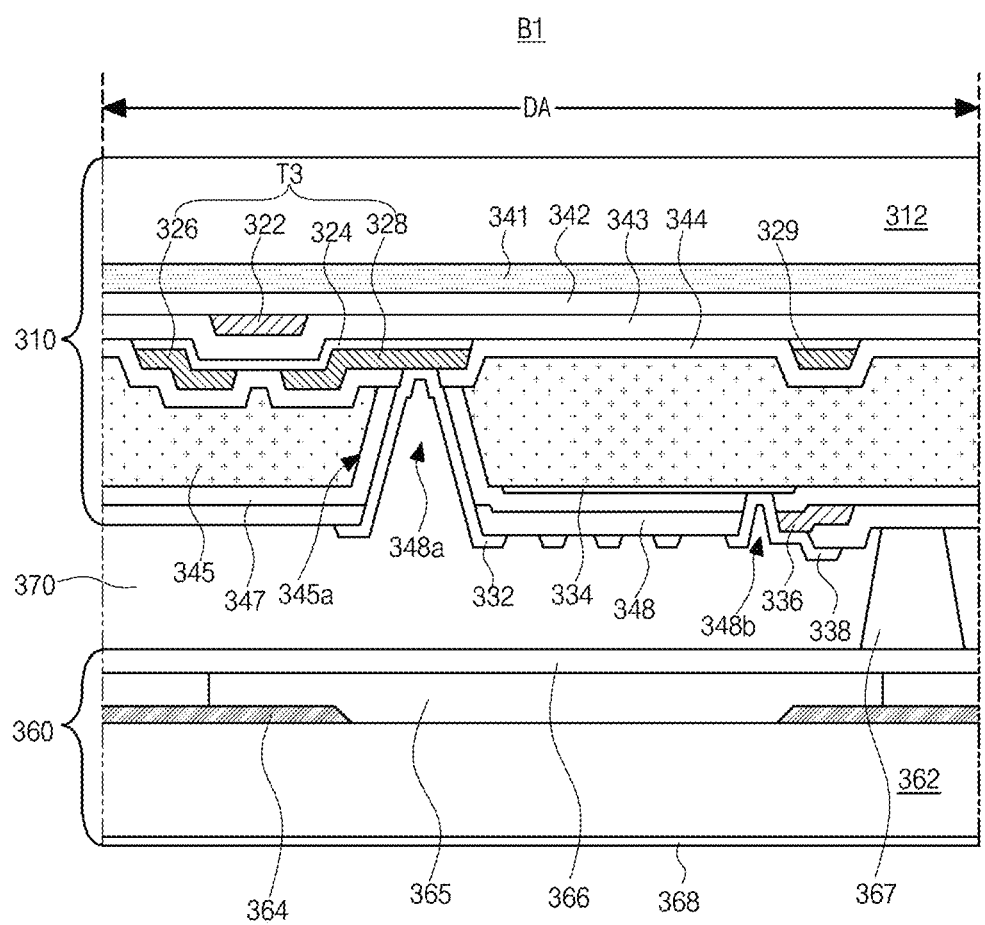
FIG. 7 illustrates a sectional view of a sub-pixel of the liquid crystal panel of the LCD device according to the third example embodiment of the present disclosure.
Figure 8:
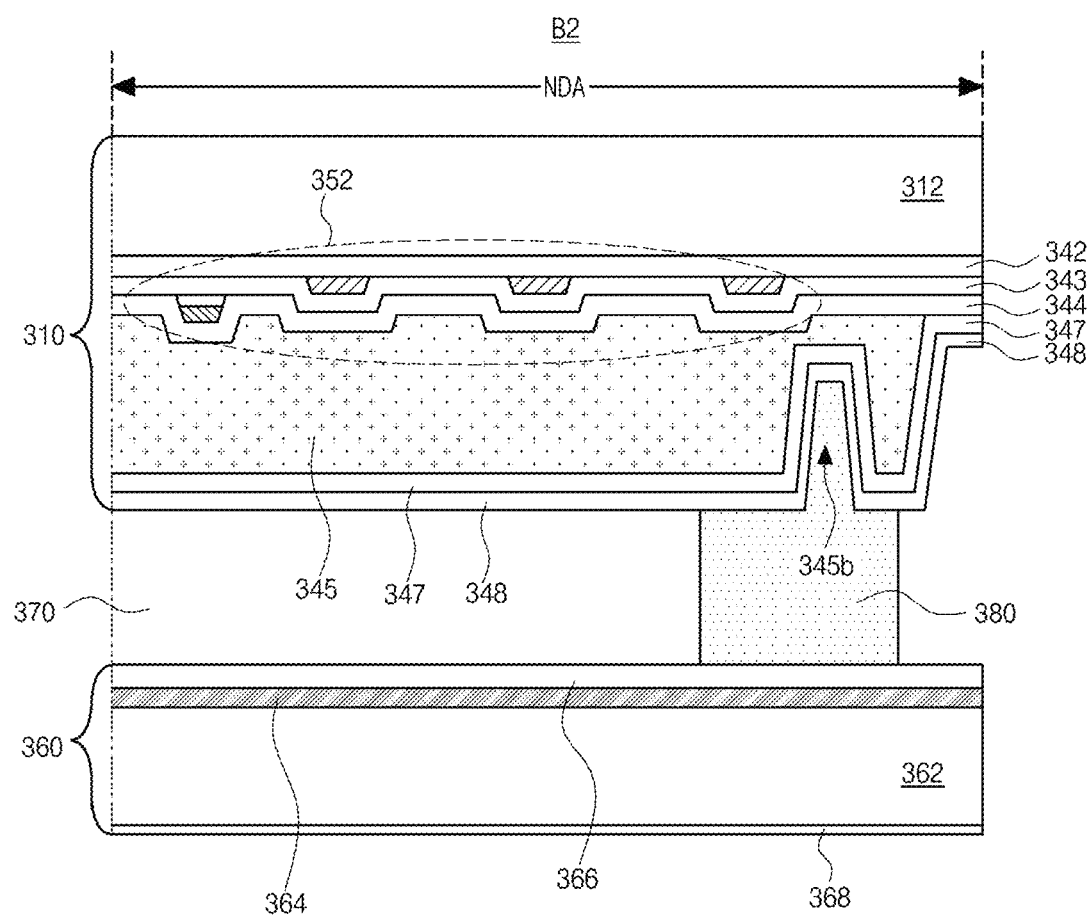
FIG. 8 illustrates a sectional view of a gate driving portion of the liquid crystal panel of the LCD device according to the third example embodiment of the present disclosure.
Figure 9:
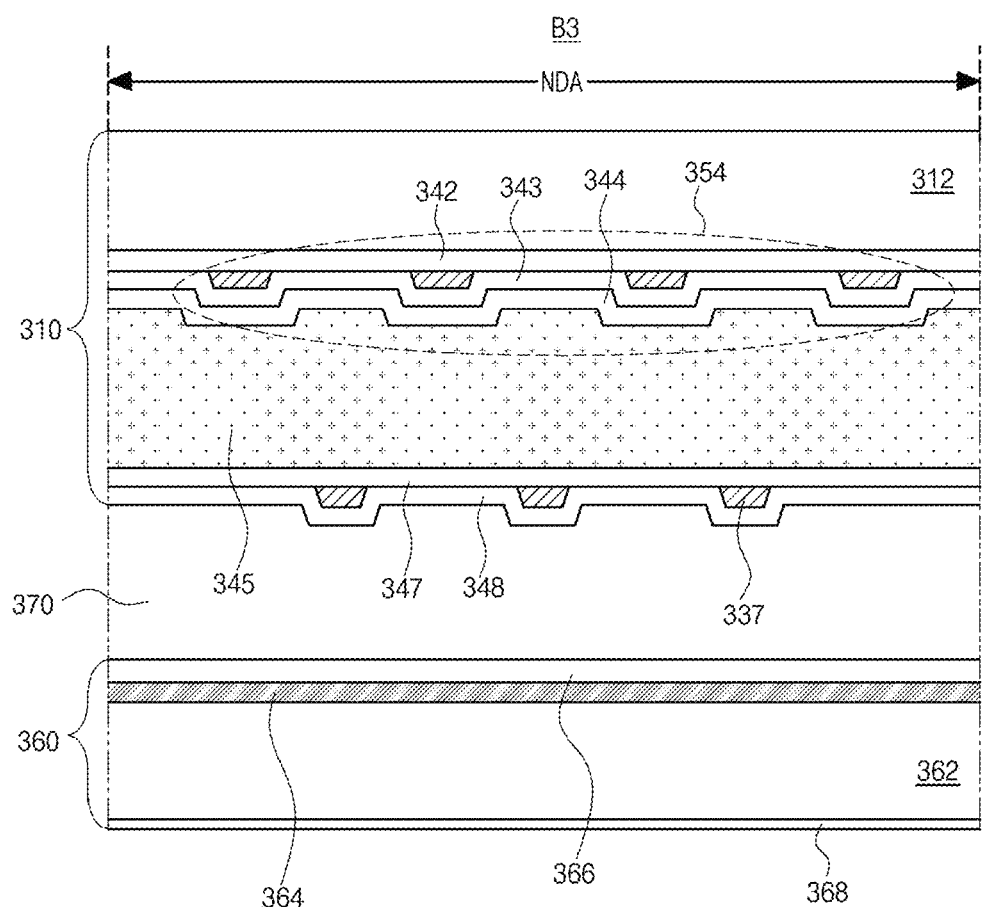
FIG. 9 illustrates a sectional view of a link portion of the liquid crystal panel of the LCD device according to the third example embodiment of the present disclosure.

A sectional structure of the liquid crystal panel of the LCD device according to the third example embodiment of the present disclosure will be described with reference to FIGS. 7 to 9. FIG. 7 illustrates a sectional view of a sub-pixel of the liquid crystal panel of the LCD device according to the third example embodiment of the present disclosure. For example, FIG. 7 illustrates a sectional structure of a region 'B1' corresponding to the sub-pixel in the display region of an example embodiment illustrated in FIG. 6. FIG. 8 illustrates a sectional view of a gate driving portion of the liquid crystal panel of the LCD device according to the third example embodiment of the present disclosure. For example, FIG. 8 illustrates a sectional structure of a region 'B2' corresponding to the gate driving portion in the non-display region of an example embodiment illustrated in FIG. 6. FIG. 9 illustrates a sectional view of a link portion of the liquid crystal panel of the LCD device according to the third example embodiment of the present disclosure. For example, FIG. 9 illustrates a sectional structure of a region 'B3' corresponding to the link portion in the non-display region of an example embodiment illustrated in FIG. 6.

Except for structural differences associated with a touch line, a buffer layer, and a touch insulating layer, the liquid crystal panel of the LCD device according to the third example embodiment of the present disclosure may be configured to have substantially the same structure as that in the first example embodiment. To avoid repeating an overlapping description, the same elements as in the first example embodiment will be identified by the same reference numbers.

As shown in FIGS. 7, 8, and 9, the liquid crystal panel of the LCD device according to the third example embodiment of the present disclosure may include an array substrate 310, a color filter substrate 360, and a liquid crystal layer 370 between the two substrates 310 and 360. The color filter substrate 360 may be placed between the array substrate 310 and a backlight unit (not shown).

The array substrate 310 may include a first substrate 312, an organic buffer layer 341, a thin film transistor T3, a pixel electrode 332, a common electrode 334, and a touch line 336. The color filter substrate 360 may include a second substrate 362, a black matrix 364, a color filter layer 365, and an overcoat layer 366.

In detail, the display and non-display regions DA and NDA may be defined in the first substrate 312 of the array substrate 310 and the second substrate 362 of the color filter substrate 360. The first substrate 312 and the second substrate 362 may be formed of or may include at least one of glass and plastic materials.

The organic buffer layer 341 may be formed on or disposed on an inner surface of the first substrate 312. The organic buffer layer 341 may be formed of or may include an organic insulating material and may be placed in the display region DA. As an example, the organic buffer layer 341 may be formed of or may include polyimide (PI), polyamide (PA), photo acryl, or benzocyclobutene (BCB). But the inventive concept of the present disclosure is not limited to these example embodiments.

The organic buffer layer 341 may have a thickness in a range of from 20 Å to 50 μm, from 50 Å to 20 μm, or from 300 Å to 1 μm.

An inorganic buffer layer 342 may be formed on or disposed on the organic buffer layer 341. The inorganic buffer layer 342 may be formed on or disposed on the surface (e.g., substantially the entire surface) of the first substrate 312. The inorganic buffer layer 342 may be placed in both the display and non-display regions DA and NDA. The inorganic buffer layer 342 may be formed of or may include silicon nitride ($SiN_x$) or silicon oxide ($SiO_2$).

The inorganic buffer layer 342, which may be in contact with the organic buffer layer 341 in the display region DA. The inorganic buffer layer 242 may be in contact with the first substrate 312 in the non-display region NDA. The inorganic buffer layer 342 a step difference near a boundary between the display and non-display regions DA and NDA.

Next, a gate electrode 322, which may be made of or may include a conductive material, may be formed on or disposed on the inorganic buffer layer 342 of the display region DA.

A gate insulating layer 343, which may be made of or may include an inorganic insulating material, may be formed on or disposed on the gate electrode 322. The gate insulating layer 343 may be placed in both the display and non-display regions DA and NDA.

A semiconductor layer 324 may be formed on or disposed on the gate insulating layer 343 corresponding to the gate electrode 322. The semiconductor layer 324 may be formed of or may include an oxide semiconductor material. Alternatively, the semiconductor layer 324 may be formed of or may include amorphous silicon.

Next, source and drain electrodes 326 and 328, which are formed of or include a conductive material, may be formed on or disposed on the semiconductor layer 324.

The gate electrode 322, the semiconductor layer 324, the source electrode 326, and the drain electrode 328 may constitute the thin film transistor T3.

The data line 329, which may be made of or may include the same material as the source and drain electrodes 326 and 328, may be formed on or disposed on the gate insulating layer 343. In addition, a semiconductor pattern, which may be made of or may include the same material as the semiconductor layer 324, may be formed or disposed between the gate insulating layer 343 and the data line 329.

A protective layer 344, which may be made of or may include an inorganic insulating material, may be formed on or disposed on the source and drain electrodes 326 and 328. The protective layer 344 may be placed in both the display and non-display regions DA and NDA.

A planarization layer 345, which may be made of or may include an organic insulating material, may be formed on or disposed on the protective layer 344. The planarization layer 345 may be placed in both the display and non-display regions DA and NDA. The planarization layer 345 may have a flat top surface.

The planarization layer 345 may have a first contact hole 345a, which is formed at or disposed at a position corresponding to a portion of the drain electrode 328. In an embodiment, the first contact hole 345a may expose a portion of a surface of the protective layer 344 facing the color filter substrate 360.

Furthermore, the planarization layer 345 may have a groove 345b in the non-display region NDA. An edge portion of the planarization layer 345 may be removed to expose the surface of the protective layer 344 corresponding thereto.

The common electrode 334 may be formed on or disposed on the planarization layer 345. The common electrode 334 may be formed of or may include a transparent conductive material (e.g., ITO or IZO). The common electrode 334 may be patterned to include a plurality of patterns, which are separately disposed in respective touch blocks, and may be used as a touch electrode.

A buffer layer, which may be made of or may include an inorganic insulating material, may further be formed or disposed between the planarization layer 345 and the common electrode 334.

A touch insulating layer 347, which may be made of or may include an inorganic insulating material, may be formed on or disposed on the common electrode 334. The touch insulating layer 347 may be placed in both the display and non-display regions DA and NDA. In the display region DA, the touch insulating layer 347 may be in contact with a side surface of the planarization layer 345. Furthermore, in the non-display region NDA, the touch insulating layer 347 may be in contact with a side surface of the planarization layer 345 and the surface of the protective layer 344.

The touch line 336, which may be made of or may include a conductive material, may be formed on or disposed on the touch insulating layer 347. The touch line 336 may be overlapped with the data line 329.

A passivation layer 348, which may be made of or may include an inorganic insulating material, may be formed on or disposed on the touch line 336. The passivation layer 348 may be placed in both the display and non-display regions DA and NDA.

In the display region DA, the passivation layer 348 may have a second contact hole 348a to expose the drain electrode 328. Here, the second contact hole 348a may also be formed in or disposed in the touch insulating layer 347 and the protective layer 344. Furthermore, the passivation layer 348 may have a touch contact hole 348b to expose the touch line 336 and the common electrode 334. The touch contact hole 348b may also be formed in or disposed in the touch insulating layer 347.

The pixel electrode 332, which may be made of or may include a conductive material, may be formed on or disposed on the passivation layer 348. The pixel electrode 332 may be formed of or may include a transparent conductive material (e.g., ITO or IZO).

The pixel electrode 332 may include a plurality of patterns and may be overlapped with the common electrode 334. The pixel electrode 332 may be in contact with the drain electrode 328 through the second contact hole 348a, which is formed in or disposed in the first contact hole 345a.

In addition, a touch connection electrode 338, which may be made of or may include the same material as the pixel electrode 332, may be formed on or disposed on the passivation layer 348. The touch connection electrode 338 may be in contact with the common electrode 334 and the touch line 336 through the touch contact hole 348b.

Accordingly, the common electrode 334 may be connected to the touch line 336 and may be used as a touch electrode of receiving a touch driving voltage through the touch line 336 and transmitting a touch sensing voltage to the touch line 336.

A plurality of driving lines 352, at least one data link line 354, and at least one touch link line 337 may be disposed in the non-display region NDA.

The driving line 352 may include a plurality of patterns, which are formed in or disposed in the same layer and formed of or include the same material as the gate electrode 322 or the source and drain electrodes 326 and 328. The driving line 352 may include a common line, a test line, and a gate driving portion, which is provided in the form of GIP.

Here, the gate driving portion may be placed between the inorganic buffer layer 342 and the protective layer 344. The inorganic buffer layer 342 may have a step difference between the display region DA and the gate driving portion.

The data link line 354 may include a plurality of patterns, which are formed in or disposed in the same layer and formed of or include the same material as the source and drain electrodes 326 and 328. The data link line 354 may be connected to the data line 329 in the display region DA.

Furthermore, the touch link line 337 may be formed in or disposed in the same layer. The touch link line 337 may be formed of or may include the same material as the touch line 336 of the display region DA. The touch link line 337 may be connected to the touch line 336.

Next, the second substrate 362 may be disposed to be spaced apart from the first substrate 312. The black matrix 364 may be formed on or disposed on an inner surface of the second substrate 362. The black matrix 364 may be formed in or disposed in a region corresponding to a border of each sub-pixel in the display region DA and may be formed throughout the non-display region NDA.

The black matrix 364 may be formed of or may include a black resin. Alternatively, the black matrix 364 may be formed of or may include an optically-reflective metal.

The color filter layer 365 may be formed on or disposed on the black matrix 364 in the display region DA. The color filter layer 365 may include red, green, and blue color filters. Each of the color filters may correspond to one of the sub-pixels.

The overcoat layer 366, which may be made of or may include an insulating material, may be formed on or disposed on the color filter layer 365. The overcoat layer 366 may be placed in the display and non-display regions DA and NDA. In the non-display region NDA, the overcoat layer 366 may be in contact with the black matrix 364.

A column spacer 367, which may be made of or may include an insulating material, may be formed on or disposed on the overcoat layer 366. The column spacer 367 may be formed to or disposed to correspond to the black matrix 364 in the display region DA. The column spacer 367 may be configured to maintain a cell gap between the array substrate 310 and the color filter substrate 360.

In addition, an ESD prevention layer 368, which may be made of or may include a transparent conductive material (e.g., ITO or IZO), may be formed on or disposed on an outer surface of the second substrate 362 to cover the surface (e.g., substantially the entire surface) of the second substrate 362.

The liquid crystal layer 370 may be placed between the array substrate 310 and the color filter substrate 360.

Furthermore, the seal pattern 380 may be formed or disposed between the array substrate 310 and the color filter substrate 360, for example, in the non-display region NDA between the passivation layer 348 and the overcoat layer 366. The seal pattern 380 may enclose the display region DA and to prevent or reduce the possibility of the liquid crystal of the liquid crystal layer 370 leaking. The seal pattern 380 may be formed at or disposed at a position corresponding to the groove 345b of the planarization layer 345. In this case, a contact area between the seal pattern 380 and the array substrate 310 may be increased by the groove 345b.

Although not shown, a backlight unit (not shown) may be disposed below the color filter substrate 360 to send photons to the liquid crystal panel.

In the LCD device according to the third example embodiment of the present disclosure, by providing the touch line 336 in the first substrate 312 of the array substrate 310 and connecting the touch line 336 to the touch electrode (e.g., the common electrode 334), it may be possible to realize a touch screen in an integrated form.

According to the afore-described example embodiments of the present disclosure, the black matrix 164, 264, or 364 may be formed of or may include an optically-reflective metal. This may make it possible to increase the brightness of the panel. Here, an electromagnetic coupling, which is caused by the metallic black matrix, may induce an additional electric field in the liquid crystal layer or may affect an electric field induced in the liquid crystal layer. In this case, the brightness of a pixel that should be in a black state may increase, causing a decrease in the contrast ratio of the pixel. Hereinafter, fourth to ninth example embodiments, in each of which the LCD device is configured to shield the electric field caused by the metallic black matrix, will be described in more detail with reference to FIGS. 10 to 16.

Fourth Example Embodiment

Figure 10:
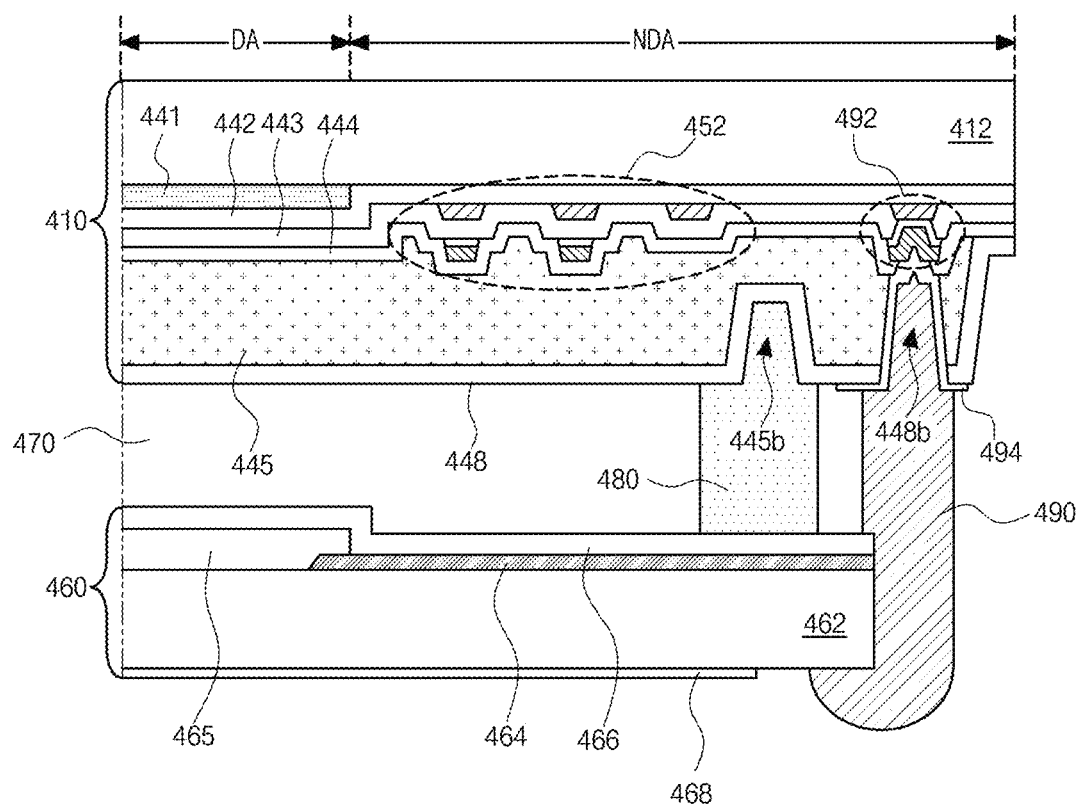
FIG. 10 illustrates a sectional view of a liquid crystal panel of an LCD device according to a fourth example embodiment of the present disclosure.

FIG. 10 illustrates a sectional view of a liquid crystal panel of an LCD device according to a fourth example embodiment of the present disclosure. Except for a structure of applying a voltage to a black matrix, the liquid crystal panel of the LCD device according to the fourth example embodiment of the present disclosure may be configured to have substantially the same features as that in the first example embodiment. In the following description, a previously-described element may be identified by the same reference number without repeating an overlapping description thereof, for the sake of brevity.

As shown in FIG. 10, the liquid crystal panel of the LCD device according to the fourth example embodiment of the present disclosure may include an array substrate 410, a color filter substrate 460, and a liquid crystal layer 470 between the two substrates 410 and 460. The color filter substrate 460 may be placed between the array substrate 410 and a backlight unit (not shown).

The array substrate 410 may include a first substrate 412, an organic buffer layer 441, a thin film transistor (not shown), a pixel electrode (not shown), and a common electrode (not shown). The color filter substrate 460 may include a second substrate 462, a black matrix 464, a color filter layer 465, and an overcoat layer 466.

In detail, the display and non-display regions DA and NDA may be defined in the first substrate 412 of the array substrate 410 and the second substrate 462 of the color filter substrate 460. The first substrate 412 and the second substrate 462 may be formed of or may include at least one of glass and plastic materials.

The organic buffer layer 441 may be formed on or disposed on an inner surface of the first substrate 412. The organic buffer layer 441 may be formed of or may include an organic insulating material and may be placed in the display region DA. As an example, the organic buffer layer 441 may be formed of or may include polyimide (PI), polyamide (PA), photo acryl, or benzocyclobutene (BCB). But the inventive concept of the present disclosure is not limited to these example embodiments.

The organic buffer layer 441 may have a thickness in a range of from 20 Å to 50 μm, from 50 Å to 20 μm, or from 300 Å to 1 μm.

An inorganic buffer layer 442 may be formed on or disposed on the organic buffer layer 441. The inorganic buffer layer 442 may be formed on or disposed on the surface (e.g., substantially the entire surface) of the first substrate 412. The inorganic buffer layer 442 may be placed in both the display and non-display regions DA and NDA. The inorganic buffer layer 442 may be formed of or may include silicon nitride ($SiN_x$) or silicon oxide ($SiO_2$).

The inorganic buffer layer 442 may be in contact with the organic buffer layer 441 in the display region DA. The inorganic buffer layer 242 may be in contact with the first substrate 412 in the non-display region NDA. The inorganic buffer layer 442 may have a step difference near a boundary between the display and non-display regions DA and NDA.

Next, a gate insulating layer 443, which may be made of or may include an inorganic insulating material, may be formed on or disposed on the inorganic buffer layer 442. The gate insulating layer 443 may be placed in both the display and non-display regions DA and NDA.

A protective layer 444, which may be made of or may include an inorganic insulating material, may be formed on or disposed on the gate insulating layer 443. The protective layer 444 may be placed in both the display and non-display regions DA and NDA.

Although not shown, a thin film transistor may be formed or disposed between the inorganic buffer layer 442 and the protective layer 444, which are disposed in the display region DA.

A plurality of driving lines 452 may be disposed in the non-display region NDA. The driving line 452 may include a plurality of patterns, which are disposed in the display region DA and are formed in or disposed in the same layer. The plurality of patterns may be formed of or include the same material as a gate electrode (not shown) between the inorganic buffer layer 442 and the gate insulating layer 443. Alternatively, the plurality of patterns may be formed of or include the same material as source and drain electrodes (not shown) between the gate insulating layer 443 and the protective layer 444. The driving line 452 may include a signal line and a gate driving portion, which is provided in the form of GIP.

Here, the gate driving portion may be placed between the inorganic buffer layer 442 and the protective layer 444. The inorganic buffer layer 442 may have a step difference between the display region DA and the gate driving portion.

In addition, an auxiliary pad 492 may be disposed in the non-display region NDA, and may include a plurality of patterns, which are formed in or disposed in the same layer and formed of or include the same material as the gate electrode or the source and drain electrode.

Next, a planarization layer 445, which may be made of or may include an organic insulating material, may be formed on or disposed on the protective layer 444. The planarization layer 445 may be placed in both the display and non-display regions DA and NDA. The planarization layer 445 may have a flat top surface.

The planarization layer 445 may be formed to have a groove 445b in the non-display region NDA. An edge portion of the planarization layer 445 may be removed to expose a surface of the protective layer 444 corresponding thereto.

A passivation layer 448, which may be made of or may include an inorganic insulating material, may be formed on or disposed on the planarization layer 445. The passivation layer 448 may be placed in both the display and non-display regions DA and NDA. In the non-display region NDA, the passivation layer 448 may have an auxiliary contact hole 448b exposing the auxiliary pad 492. Here, the auxiliary contact hole 448b may also be formed in or disposed in the planarization layer 445 and the protective layer 444.

Although not shown, a common electrode, which may be made of or may include a conductive material, may be formed or disposed between the planarization layer 445 and the passivation layer 448 in the display region DA. Furthermore, a pixel electrode, which may be made of or may include a conductive material, may be formed on or disposed on the passivation layer 448. The common electrode and the pixel electrode may be formed of or may include a transparent conductive material (e.g., ITO or IZO).

An auxiliary electrode 494, which may be made of or may include the same material as the pixel electrode, may be formed in or disposed in the non-display region NDA on the passivation layer 448. The auxiliary electrode 494 may be in contact with the auxiliary pad 492 through the auxiliary contact hole 448b.

Next, the second substrate 462 may be disposed to be spaced apart from the first substrate 412. The black matrix 464 may be formed on or disposed on an inner surface of the second substrate 462. The black matrix 464 may be formed in or disposed in a region corresponding to a border of each sub-pixel in the display region DA and may be formed throughout the non-display region NDA.

The black matrix 464 may be formed of or may include an optically-reflective metal. For example, the black matrix 464 may be formed of or may include aluminum (Al) or silver (Ag) having relatively high reflectance. But the inventive concept of the present disclosure is not limited to these example embodiments.

The color filter layer 465 may be formed on or disposed on the black matrix 464 in the display region DA. The color filter layer 465 may include red, green, and blue color filters. Each of the color filters may correspond to one of the sub-pixels.

The overcoat layer 466, which may be made of or may include an insulating material, may be formed on or disposed on the color filter layer 465. The overcoat layer 466 may be placed in the display and non-display regions DA and NDA. In the non-display region NDA, the overcoat layer 466 may be in contact with the black matrix 464.

In addition, an ESD prevention layer 468, which may be made of or may include a transparent conductive material (e.g., ITO or IZO), may be formed on or disposed on an outer surface of the second substrate 462 in both the display and non-display regions DA and NDA. In an embodiment, a portion of the ESD prevention layer 468 may be removed from an edge portion of the non-display region NDA to expose the outer surface of the second substrate 462.

The liquid crystal layer 470 may be placed between the array substrate 410 and the color filter substrate 460.

Furthermore, a seal pattern 480 may be formed or disposed between the array substrate 410 and the color filter substrate 460, for example, in the non-display region NDA between the passivation layer 448 and the overcoat layer 466. The seal pattern 480 may enclose the display region DA and to prevent or reduce the possibility of the liquid crystal of the liquid crystal layer 470 leaking from the display region DA. The seal pattern 480 may be formed at or disposed at a position corresponding to the groove 445b of the planarization layer 445. In this case, a contact area between the seal pattern 480 and the array substrate 410 may be increased by the groove 445b.

A connection pattern 490 may be formed in or disposed in a region, which is located outside the seal pattern 480. The connection pattern 490 may be in contact with the auxiliary electrode 494 of the array substrate 410 and the black matrix 464 of the color filter substrate 460. Accordingly, the connection pattern 490 may electrically connect the auxiliary pad 492 to the black matrix 464 and in this case, a specific voltage (e.g., a fixed DC voltage) may be applied to the black matrix 464 through the auxiliary pad 492. As an example, a common voltage of the common electrode may be applied to the black matrix 464. But the inventive concept of the present disclosure is not limited to this example embodiment. The connection pattern 490 may be composed of a silver dot. The connection pattern 490 may be in contact with a side surface and the outer surface of the second substrate 462 and may be in contact with side surfaces of the overcoat layer and black matrix 466 and 464. The connection pattern 490 may be spaced apart from the ESD prevention layer 468.

Although not shown, a backlight unit (not shown) may be disposed below the color filter substrate 460 and may be configured to send photons to the liquid crystal panel.

In the afore-described LCD device according to the fourth example embodiment of the present disclosure, by forming the black matrix 464 with a metallic material, it may be possible to increase the brightness of the device, and additionally by applying a specific voltage to the black matrix 464, it may be possible to shield the influence from the electric field, which may be caused by the black matrix 464.

Fifth Example Embodiment

Figure 11:
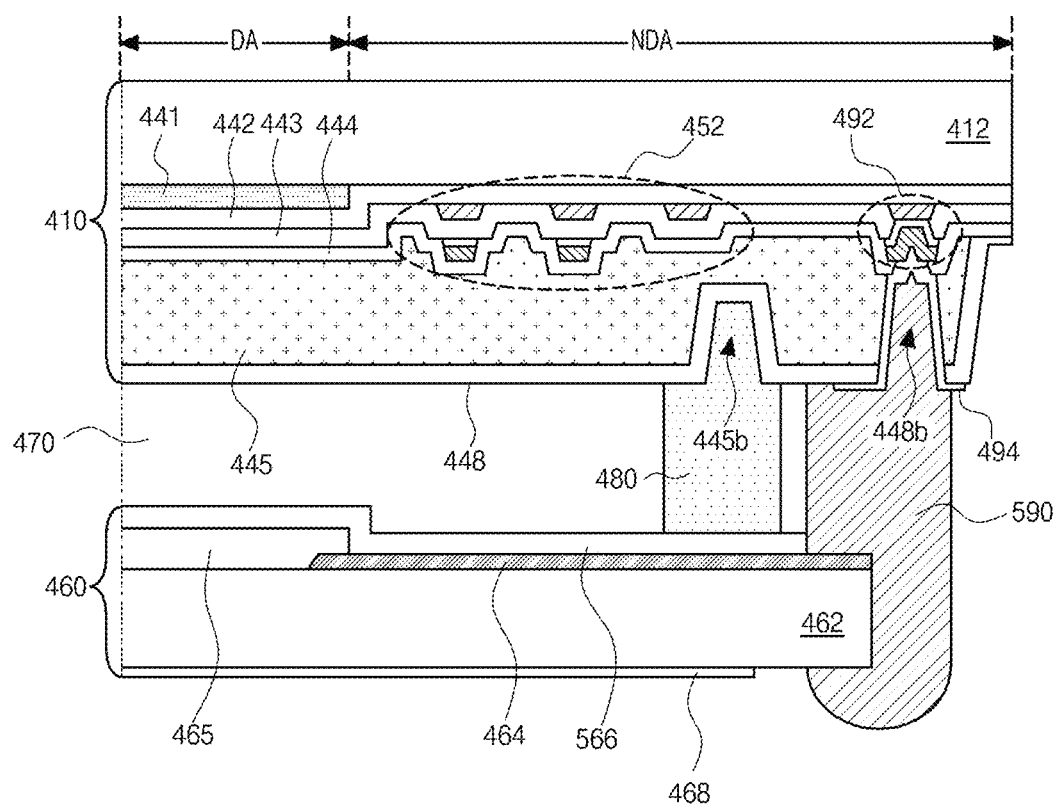
FIG. 11 illustrates a sectional view of a liquid crystal panel of an LCD device according to a fifth example embodiment of the present disclosure.

FIG. 11 illustrates a sectional view of a liquid crystal panel of an LCD device according to a fifth example embodiment of the present disclosure. Except for some differences associated with an overcoat layer and a connection pattern, the liquid crystal panel of the LCD device according to the fifth example embodiment of the present disclosure may be configured to have the same features as that in the fourth example embodiment. In the following description, a previously-described element may be identified by the same reference number without repeating an overlapping description thereof, for the sake of brevity.

As shown in FIG. 11, the liquid crystal panel of the LCD device according to the fifth example embodiment of the present disclosure may include the array substrate 410, the color filter substrate 460, and the liquid crystal layer 470 between the two substrates 410 and 460. The color filter substrate 460 may be placed between an array substrate 410 and a backlight unit (not shown).

The organic buffer layer 441, the inorganic buffer layer 442, the gate insulating layer 443, the protective layer 444, the planarization layer 445, and the passivation layer 448 may be sequentially formed on or disposed on an inner surface of the first substrate 412 in the array substrate 410. In addition, a plurality of driving lines 452, at least one auxiliary pad 492, and at least one auxiliary electrode 494 may be formed on or disposed on the first substrate 412 in the non-display region NDA.

The black matrix 464, the color filter layer 465, and an overcoat layer 566 may be sequentially formed on or disposed on the inner surface of the second substrate 462 in the color filter substrate 460. The ESD prevention layer 468 may be formed on or disposed on the outer surface of the second substrate 462.

Here, an edge portion of the overcoat layer 566 may be removed to partially expose a top surface of the black matrix 464 in the non-display region NDA.

The liquid crystal layer 470 may be placed between the array substrate 410 and the color filter substrate 460. The seal pattern 480 may be formed or disposed between the array substrate 410 and the color filter substrate 460 in the non-display region NDA.

A connection pattern 590 may be formed outside the seal pattern 480. The connection pattern 590 may be in contact with the auxiliary electrode 494 of the array substrate 410 and the black matrix 464 of the color filter substrate 460. Here, the connection pattern 590 may be in contact with a side surface and an outer surface of the second substrate 462, may be in contact with side surfaces of the overcoat layer 566 and the black matrix 464, and may also be in contact with a top surface of the black matrix 464 exposed by the overcoat layer 566.

Accordingly, the connection pattern 590 may electrically connect the auxiliary pad 492 to the black matrix 464 and may apply a specific voltage to the black matrix 464 through the auxiliary pad 492. As an example, a common voltage may be applied to the black matrix 464. But the inventive concept of the present disclosure is not limited to this example embodiment.

The connection pattern 590 may be composed of a silver dot.

In the LCD device according to the fifth example embodiment of the present disclosure, by increasing a contact area between the black matrix 464 and the connection pattern 590, it may be possible to stably apply a voltage to the black matrix 464.

Sixth Example Embodiment

Figure 12:
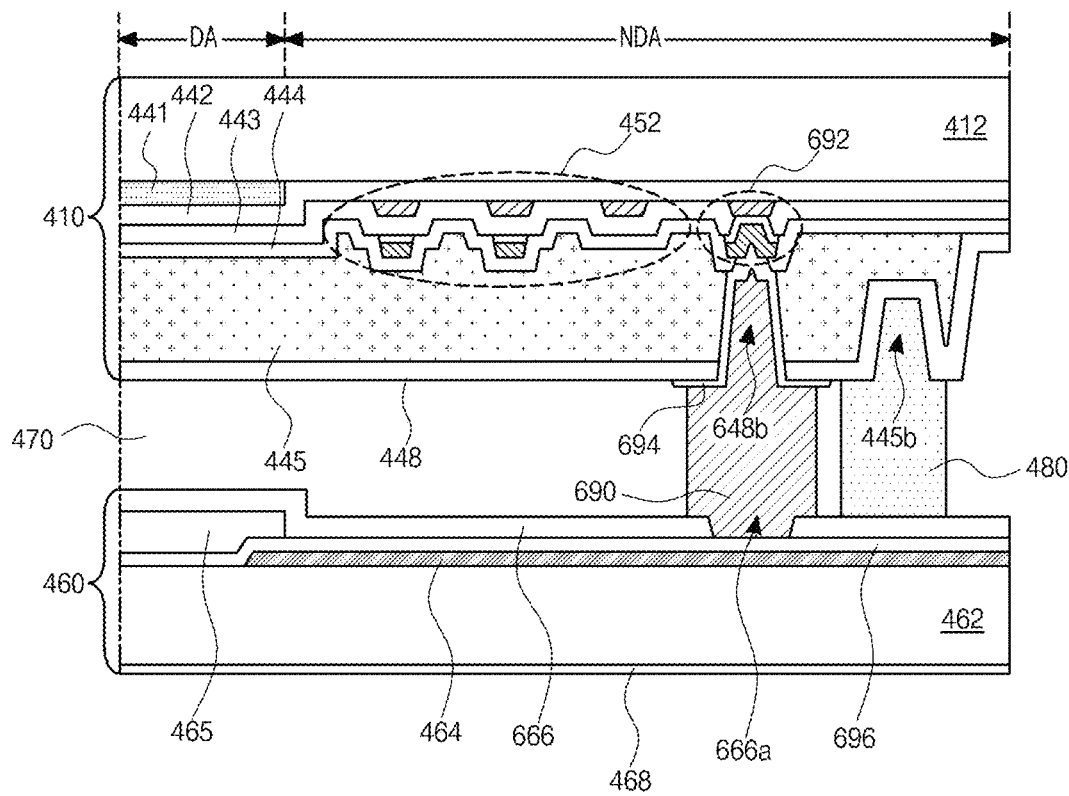
FIG. 12 illustrates a sectional view of a liquid crystal panel of an LCD device according to a sixth example embodiment of the present disclosure.

FIG. 12 illustrates a sectional view of a liquid crystal panel of an LCD device according to a sixth example embodiment of the present disclosure. Except for a connection structure between a shielding electrode and a conductive seal pattern, the liquid crystal panel of the LCD device according to the sixth example embodiment of the present disclosure may be configured to have substantially the same features as that in the fourth example embodiment. In the following description, a previously-described element may be identified by the same reference number without repeating an overlapping description thereof, for the sake of brevity.

As shown in FIG. 12, the liquid crystal panel of the LCD device according to the sixth example embodiment of the present disclosure may include the array substrate 410, the color filter substrate 460, and the liquid crystal layer 470 between the two substrates 410 and 460. The color filter substrate 460 may be placed between the array substrate 410 and a backlight unit (not shown).

The organic buffer layer 441, the inorganic buffer layer 442, the gate insulating layer 443, the protective layer 444, the planarization layer 445, and the passivation layer 448 may be sequentially formed on or disposed on an inner surface of the first substrate 412 in the array substrate 410. Furthermore, a plurality of driving lines 452, at least one auxiliary pad 692, and at least one auxiliary electrode 694 may be formed on or disposed on the first substrate 412 in the non-display region NDA. Here, the auxiliary electrode 694 may be in contact with the auxiliary pad 692 through a first auxiliary contact hole 648b.

The black matrix 464, a shielding electrode 696, the color filter layer 465, and an overcoat layer 666 may be sequentially formed on or disposed on the inner surface of the second substrate 462 in the color filter substrate 460. The ESD prevention layer 468 may be formed on or disposed on the outer surface of the second substrate 462.

Here, the shielding electrode 696 may be overlapped with and in contact with the black matrix 464. The shielding electrode 696 may be formed of or may include a transparent conductive material and may be formed on or disposed on the surface (e.g., substantially the entire surface) of the second substrate 462. Alternatively, the shielding electrode 696 may be formed of or may include a metallic material. In this case, the shielding electrode 696 may have the same shape (i.e., a lattice shape) as the black matrix 464.

The overcoat layer 666 may have a second auxiliary contact hole 666a to expose the shielding electrode 696 in the non-display region NDA.

The liquid crystal layer 470 may be placed between the array substrate 410 and the color filter substrate 460. The seal pattern 480 may be formed or disposed between the array substrate 410 and the color filter substrate 460 in the non-display region NDA.

In addition, a conductive seal pattern 690 may be formed in or disposed in a region, which is located inside the seal pattern 480 and between the array substrate 410 and the color filter substrate 460 in the non-display region NDA. Here, the auxiliary pad 692 and the auxiliary electrode 694 may also be placed inside the seal pattern 480.

The conductive seal pattern 690 may be in contact with the auxiliary electrode 694 of the array substrate 410 and the shielding electrode 696 of the color filter substrate 460. Here, the conductive seal pattern 690 may be in contact with the shielding electrode 696 through the second auxiliary contact hole 666a.

Thus, the conductive seal pattern 690 may electrically connect the auxiliary pad 692 to the shielding electrode 696 and may be used to apply a specific voltage to the shielding electrode 696 through the auxiliary pad 692.

In the afore-described LCD device according to the sixth example embodiment of the present disclosure, by additionally providing the shielding electrode 696 on the black matrix 464 (for example, between the black matrix 464 and the overcoat layer 666 or more, and for example, between the black matrix 464 and the color filter layer 465) and applying a specific voltage to the shielding electrode 696 through the conductive seal pattern 690, it may be possible to shield the influence from the electric field, which may be caused by the black matrix 464.

Seventh Example Embodiment

Figure 13:
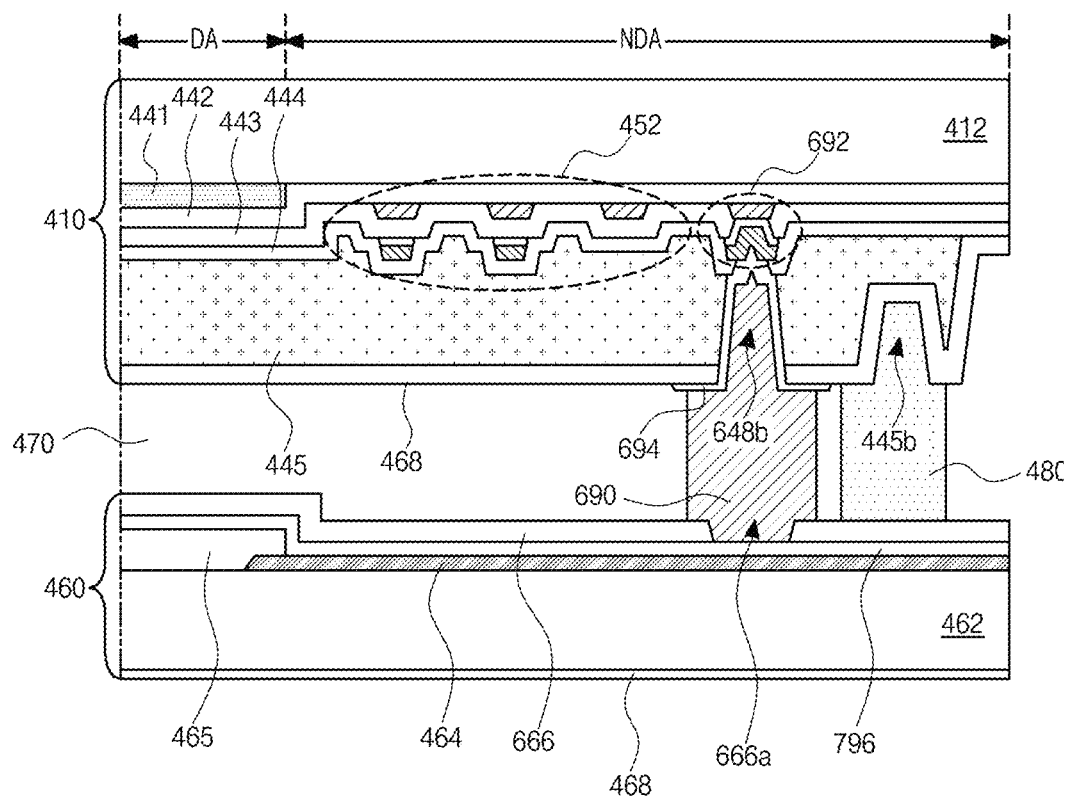
FIG. 13 illustrates a sectional view of a liquid crystal panel of an LCD device according to a seventh example embodiment of the present disclosure.

FIG. 13 illustrates a sectional view of a liquid crystal panel of an LCD device according to a seventh example embodiment of the present disclosure. Except for a difference in a position of a shielding electrode, the liquid crystal panel of the LCD device according to the seventh example embodiment of the present disclosure may be configured to have substantially the same features as that in the sixth example embodiment. In the following description, a previously-described element may be identified by the same reference number without repeating an overlapping description thereof, for the sake of brevity.

As shown in FIG. 13, the liquid crystal panel of the LCD device according to the seventh example embodiment of the present disclosure may include the array substrate 410, the color filter substrate 460, and the liquid crystal layer 470 between the two substrates 410 and 460. The color filter substrate 460 may be placed between the array substrate 410 and a backlight unit (not shown).

The organic buffer layer 441, the inorganic buffer layer 442, the gate insulating layer 443, the protective layer 444, the planarization layer 445, and the passivation layer 448 may be sequentially formed on or disposed on an inner surface of the first substrate 412 in the array substrate 410. Furthermore, a plurality of driving lines 452, at least one auxiliary pad 692, and at least one auxiliary electrode 694 may be formed on or disposed on the first substrate 412 in the non-display region NDA. Here, the auxiliary electrode 694 may be in contact with the auxiliary pad 692 through the first auxiliary contact hole 648b.

The black matrix 464, the color filter layer 465, a shielding electrode 796, and the overcoat layer 666 may be sequentially formed on or disposed on the inner surface of the second substrate 462 in the color filter substrate 460. The ESD prevention layer 468 may be formed on or disposed on the outer surface of the second substrate 462.

In the non-display region NDA, the shielding electrode 796 may be overlapped with and in contact with the black matrix 464. The shielding electrode 796 may be formed of or may include a transparent conductive material and may be formed on or disposed on the surface (e.g., substantially the entire surface) of the second substrate 462. Alternatively, the shielding electrode 796 may be formed of or may include a metal. In this case, the shielding electrode 796 may have the same shape (e.g., the lattice shape) as the black matrix 464.

The overcoat layer 666 may have the second auxiliary contact hole 666a to expose a portion of the shielding electrode 796 in the non-display region NDA.

The liquid crystal layer 470 may be placed between the array substrate 410 and the color filter substrate 460. The seal pattern 480 may be formed or disposed between the array substrate 410 and the color filter substrate 460 in the non-display region NDA.

In addition, the conductive seal pattern 690 may be formed in or disposed in a region, which is located inside the seal pattern 480 and between the array substrate 410 and the color filter substrate 460 in the non-display region NDA. Here, the auxiliary pad 692 and the auxiliary electrode 694 may also be placed inside the seal pattern 480.

The conductive seal pattern 690 may be in contact with the auxiliary electrode 694 of the array substrate 410 and the shielding electrode 796 of the color filter substrate 460. Here, the conductive seal pattern 690 may be in contact with the shielding electrode 796 through the second auxiliary contact hole 666a.

Accordingly, the conductive seal pattern 690 may electrically connect the auxiliary pad 692 to the shielding electrode 796 and may be used to apply a specific voltage to the shielding electrode 796 through the auxiliary pad 692.

In the afore-described LCD device according to the seventh example embodiment of the present disclosure, by additionally providing the shielding electrode 796 on the black matrix 464 (for example, between the black matrix 464 and the overcoat layer 666, and for example, between the color filter layer 465 and the overcoat layer 666) and applying a specific voltage to the shielding electrode 796 through the conductive seal pattern 690, it may be possible to shield the influence from the electric field, which may be caused by the black matrix 464.

Eighth Example Embodiment

Figure 14:
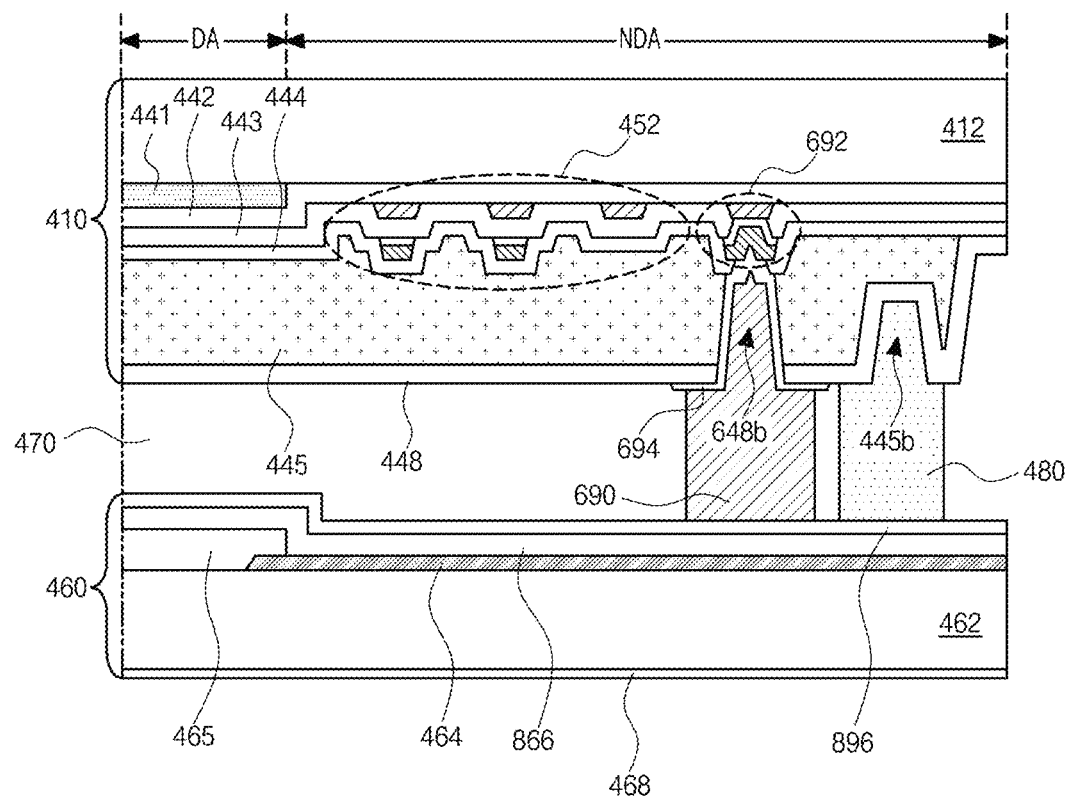
FIG. 14 illustrates a sectional view of a liquid crystal panel of an LCD device according to an eighth example embodiment of the present disclosure.

FIG. 14 illustrates a sectional view of a liquid crystal panel of an LCD device according to an eighth example embodiment of the present disclosure. Except for positional differences of an overcoat layer and a shielding electrode, the liquid crystal panel of the LCD device according to the eighth example embodiment of the present disclosure may be configured to have substantially the same structure as that in the sixth example embodiment. In the following description, a previously-described element may be identified by the same reference number without repeating an overlapping description thereof, for the sake of brevity.

As shown in FIG. 14, the liquid crystal panel of the LCD device according to the eighth example embodiment of the present disclosure may include the array substrate 410, the color filter substrate 460, and the liquid crystal layer 470 between the two substrates 410 and 460. The color filter substrate 460 may be placed between the array substrate 410 and a backlight unit (not shown).

The organic buffer layer 441, the inorganic buffer layer 442, the gate insulating layer 443, the protective layer 444, the planarization layer 445, and the passivation layer 448 may be sequentially formed on or disposed on an inner surface of the first substrate 412 in the array substrate 410. Furthermore, a plurality of driving lines 452, at least one auxiliary pad 692, and at least one auxiliary electrode 694 may be formed on or disposed on the first substrate 412 in the non-display region NDA. Here, the auxiliary electrode 694 may be in contact with the auxiliary pad 692 through the first auxiliary contact hole 648b.

The black matrix 464, the color filter layer 465, an overcoat layer 866, and a shielding electrode 896 may be sequentially formed on or disposed on the inner surface of the second substrate 462 in the color filter substrate 460. The ESD prevention layer 468 may be formed on or disposed on the outer surface of the second substrate 462.

In the non-display region NDA, the overcoat layer 866 may be overlapped with and in contact with the black matrix 464.

The shielding electrode 896 on the overcoat layer 866 may be formed of or may include a transparent conductive material and may be formed on or disposed on the surface (e.g., substantially the entire surface) of the second substrate 462. Alternatively, the shielding electrode 896 may be formed of or may include a metallic material. In this case, the shielding electrode 896 may have the same shape (i.e., a lattice shape) as the black matrix 464.

The liquid crystal layer 470 may be placed between the array substrate 410 and the color filter substrate 460. The seal pattern 480 may be formed or disposed between the array substrate 410 and the color filter substrate 460 in the non-display region NDA.

In addition, the conductive seal pattern 690 may be formed in or disposed in a region, which is located inside the seal pattern 480 and between the array substrate 410 and the color filter substrate 460 in the non-display region NDA. Here, the auxiliary pad 692 and the auxiliary electrode 694 may also be placed inside the seal pattern 480.

The conductive seal pattern 690 may be in contact with the auxiliary electrode 694 of the array substrate 410 and the shielding electrode 896 of the color filter substrate 460.

Accordingly, the conductive seal pattern 690 may electrically connect the auxiliary pad 692 to the shielding electrode 896 and may be used to apply a specific voltage to the shielding electrode 896 through the auxiliary pad 692.

In the afore-described LCD device according to the eighth example embodiment of the present disclosure, by additionally providing the shielding electrode 896 on the black matrix 464 (for example, on the overcoat layer 866) and applying a specific voltage to the shielding electrode 896 through the conductive seal pattern 690, it may be possible to shield the influence from the electric field, which may be caused by the black matrix 464.

A structure of the conductive seal pattern 690 will be described in more detail with reference to FIGS. 15 and 16.

Ninth Example Embodiment

Figure 15:
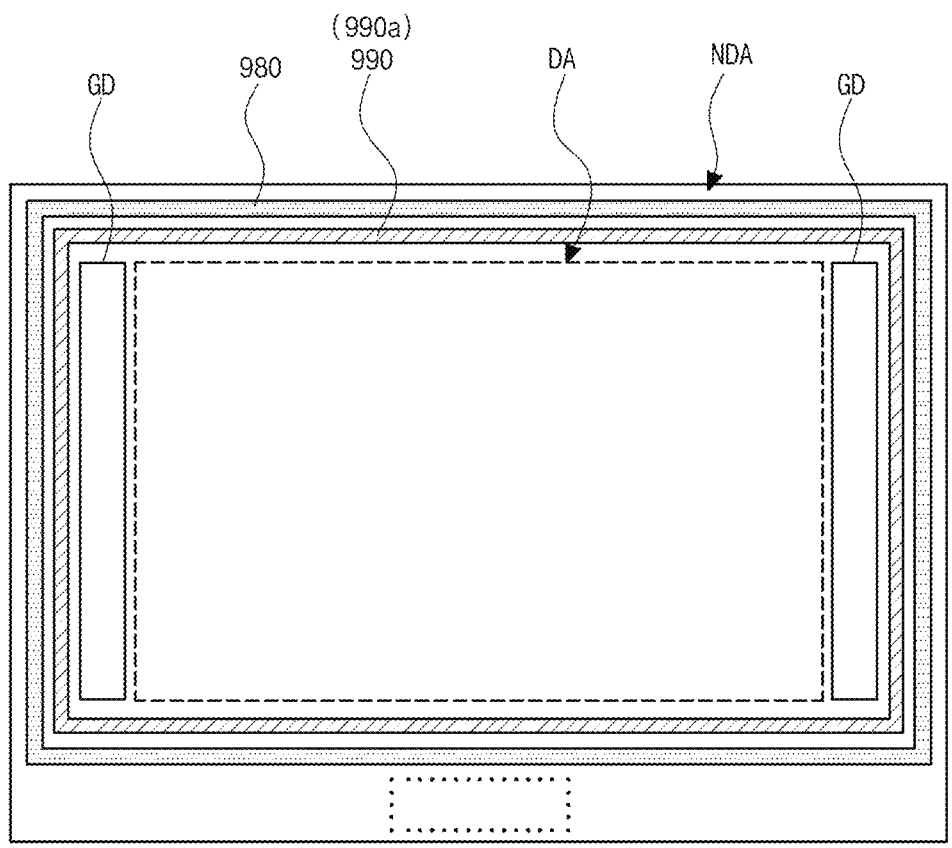
FIG. 15 illustrates a plan view of an example of a liquid crystal panel of an LCD device according to a ninth example embodiment of the present disclosure.

FIG. 15 illustrates a plan view of an example of a liquid crystal panel of an LCD device according to a ninth example embodiment of the present disclosure. FIG. 16 illustrates a plan view of another example of the liquid crystal panel of the LCD device according to the ninth example embodiment of the present disclosure. In order to reduce complexity in the drawings and to provide a better understanding of the inventive concept, some elements, except for a seal pattern and a conductive seal pattern, may be omitted from FIGS. 15 and 16.

Figure 16:
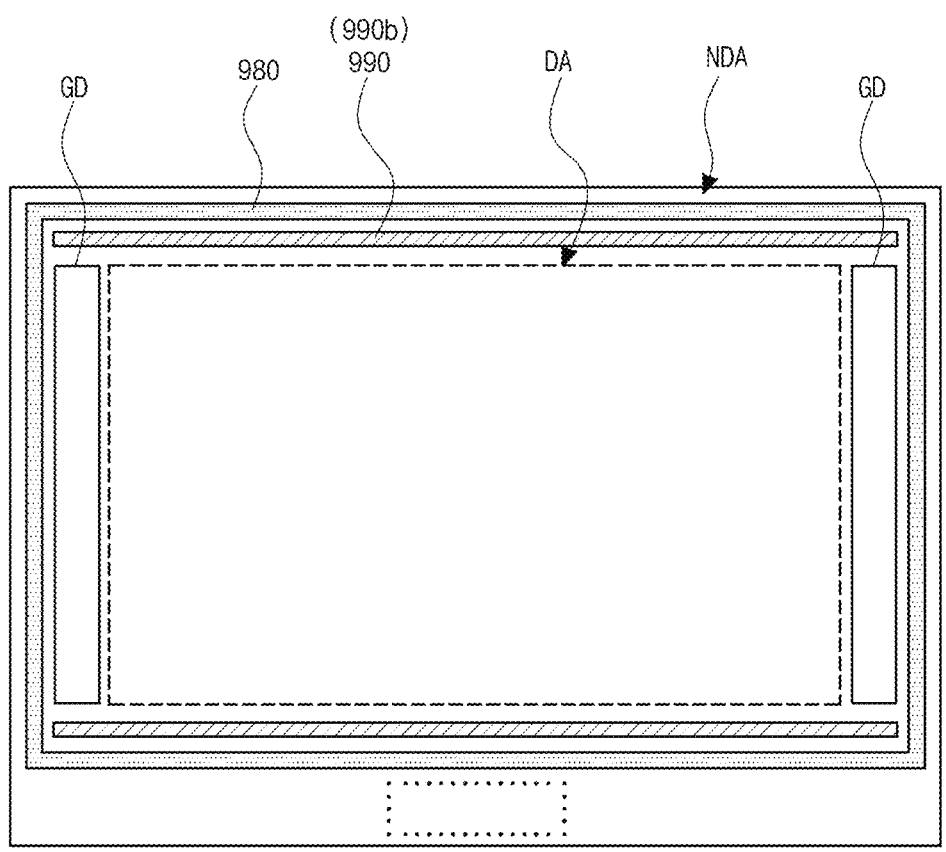
FIG. 16 illustrates a plan view of another example of the liquid crystal panel of the LCD device according to the ninth example embodiment of the present disclosure.

As shown in FIGS. 15 and 16, the liquid crystal panel of the LCD device according to the ninth example embodiment of the present disclosure may include the display region DA, which is used to display an image, and the non-display region NDA, which is disposed to enclose the display region DA.

In the display region DA, a plurality of sub-pixels may be arranged in a matrix shape. The gate driving portion GD may be disposed in the left and right portions of the non-display region NDA.

A seal pattern 980 may be formed in or disposed in the non-display region NDA to enclose the display region DA. In this case, it may be possible to prevent or reduce the possibility of the liquid crystal of the liquid crystal layer leaking from the display region DA. Here, the gate driving portion GD may be placed in a region, which is located inside the seal pattern 980 or between the seal pattern 980 and the display region DA.

Furthermore, a conductive seal pattern 990 may be disposed in the non-display region NDA and inside the seal pattern 980. The conductive seal pattern 990 may be placed between the seal pattern 980 and the display region DA. The conductive seal pattern 990 may be disposed in at least a portion of the non-display region NDA.

As shown in FIG. 15, the conductive seal pattern 990a may be formed in or disposed in left, right, upper, and lower portions of the non-display region NDA to enclose the display region DA. Accordingly, it may be possible to stably apply a voltage to a color filter substrate.

Alternatively, as shown in FIG. 16, a conductive seal pattern 990b may be disposed in the upper and lower portions of the non-display region NDA. In this case, it may be possible to increase an area of the display region DA within the same area.

As described above, in the LCD device of the present disclosure, the color filter substrate may be disposed between the array substrate and the backlight unit to minimize a width or area of a bezel region. The organic buffer layer may be disposed between the first substrate and the thin film transistor in the array substrate to improve the mechanical durability of the liquid crystal panel.

In addition, the touch line, which is connected to the common electrode, may be disposed on the array substrate. This may make it possible to form a touch screen in an integrated shape and thereby to reduce a weight and thickness of the LCD device.

Furthermore, by forming the black matrix with a metallic material, it may be possible to increase the brightness of the LCD device, and by applying a specific voltage to the black matrix, it may be possible to improve the black brightness property of the LCD device.

Example embodiments of the present disclosure can also be described as follows:

One aspect of the present disclosure relates to a liquid crystal display device including a liquid crystal panel including: a first substrate, a thin film transistor on the first substrate, an organic buffer layer between the first substrate and the thin film transistor, a second substrate, a color filter layer on the second substrate, and a liquid crystal layer between the first and second substrates. The device also includes a backlight unit below the liquid crystal panel. The second substrate is between the backlight unit and the first substrate.

In one implementation of the liquid crystal display device, the liquid crystal display device may further include: a pixel electrode connected to the thin film transistor, a common electrode overlapped with the pixel electrode, and a touch line connected to the common electrode, where the pixel electrode, the common electrode, and the touch line may be disposed on an inner surface of the first substrate.

In one implementation of the liquid crystal display device, the liquid crystal panel may have a display region and a non-display region, where the organic buffer layer may be locally placed in the display region.

In one implementation of the liquid crystal display device, the liquid crystal panel may further include an inorganic buffer layer between the organic buffer layer and the thin film transistor.

In one implementation of the liquid crystal display device, the first substrate and the second substrate may have a display region and a non-display region, where the liquid crystal panel may further include a gate driving portion that overlaps the non-display region of the first substrate, where the inorganic buffer layer may have a step difference between the display region and the gate driving portion.

In one implementation of the liquid crystal display device, the thin film transistor may include: a gate electrode, a semiconductor layer including an oxide semiconductor material, a source electrode, and a drain electrode.

In one implementation of the liquid crystal display device, the liquid crystal panel may further include a black matrix between the second substrate and the color filter layer, where the black matrix includes an optically-reflective metal.

In one implementation of the liquid crystal display device, the liquid crystal panel may further include an auxiliary pad disposed on an inner surface of the first substrate and electrically connected to the black matrix.

In one implementation of the liquid crystal display device, the liquid crystal display device may further include a connection pattern in contact with a side surface and an outer surface of the second substrate, where the black matrix may be electrically connected to the auxiliary pad through the connection pattern.

In one implementation of the liquid crystal display device, the liquid crystal panel may further include an overcoat layer on the color filter layer to expose a top surface of the black matrix, where the connection pattern may be in contact with the top surface and a side surface of the black matrix.

In one implementation of the liquid crystal display device, the liquid crystal panel may further include: a seal pattern between the first and second substrates, and a conductive seal pattern inside the seal pattern, where the black matrix may be electrically connected to the auxiliary pad through the conductive seal pattern.

In one implementation of the liquid crystal display device, the liquid crystal panel may further include a shielding electrode on the black matrix, where the conductive seal pattern may be in contact with the shielding electrode.

In one implementation of the liquid crystal display device, the shielding electrode may be between the black matrix and the color filter layer.

In one implementation of the liquid crystal display device, the shielding electrode may be on the color filter layer.

In one implementation of the liquid crystal display device, the liquid crystal panel may further include: a seal pattern between the first and second substrates, a conductive seal pattern inside the seal pattern, an overcoat layer on the color filter layer, and a shielding electrode on the overcoat layer, where the conductive seal pattern may be in contact with the shielding electrode.

In one implementation of the liquid crystal display device, the liquid crystal panel may have a display region and a non-display region enclosing the display region, where the conductive seal pattern may be in at least a portion of the non-display region.

In one implementation of the liquid crystal display device, the organic buffer layer may include polyimide, polyamide, photosensitive acrylic polymer, and/or benzocyclobutene.

In one implementation of the liquid crystal display device, the organic buffer layer may include polyimide.

In one implementation of the liquid crystal display device, the organic buffer layer may have a thickness in a range of from 20 Å to 50 μm.

It will be apparent to those skilled in the art that various modifications and variations can be made within the scope that does not deviate from the technical sprit or scope of the present disclosure. Thus, it is intended that the present disclosure covers the modifications and variations of this disclosure provided they come within the scope of the appended claims and their equivalents.

What is claimed is:

1. A liquid crystal display device, comprising:
   a liquid crystal panel including:
      a first substrate,
      a thin film transistor on the first substrate,
      an organic buffer layer between the first substrate and the thin film transistor,
      a pixel electrode connected to the thin film transistor,
      a second substrate,
      a color filter layer on the second substrate,
      a black matrix on the second substrate, and
      a liquid crystal layer between the first and second substrates; and
   a backlight unit below the liquid crystal panel,
   wherein the second substrate is between the backlight unit and the first substrate,
   wherein the liquid crystal panel has a display region and a non-display region,
   wherein a plurality of sub-pixels are arranged in the display region, and each of the plurality of sub-pixels is defined by a data line and a gate line, and
   wherein the organic buffer layer has a size equal to or larger than the display region,
   wherein the organic buffer layer has a larger size than the pixel electrode disposed in each sub-pixel and overlaps the pixel electrodes of the plurality of sub-pixels,
   wherein the organic buffer layer on the first substrate overlaps the black matrix and the color filter layer on the second substrate.

2. The liquid crystal display device of claim 1, wherein the liquid crystal panel further includes:
   a common electrode overlapped with the pixel electrode, and
   a touch line connected to the common electrode,
   wherein the pixel electrode, the common electrode, and the touch line are disposed on an inner surface of the first substrate.

3. The liquid crystal display device of claim 1,
   wherein the organic buffer layer is locally placed in the display region.

4. The liquid crystal display device of claim 1, wherein the liquid crystal panel further comprises an inorganic buffer layer between the organic buffer layer and the thin film transistor.

5. The liquid crystal display device of claim 4, wherein each of the first substrate and the second substrate has the display region and the non-display region,
   wherein the liquid crystal panel further includes a gate driving portion that overlaps the non-display region of the first substrate, and
   wherein the inorganic buffer layer has a step difference between the display region and the gate driving portion.

6. The liquid crystal display device of claim 1, wherein the thin film transistor includes:
   a gate electrode,
   a semiconductor layer including an oxide semiconductor material,
   a source electrode, and
   a drain electrode.

7. The liquid crystal display device of claim 1, wherein the liquid crystal panel further includes the black matrix is between the second substrate and the color filter layer, and
   wherein the black matrix includes an optically-reflective metal.

8. The liquid crystal display device of claim 7, wherein the liquid crystal panel further includes an auxiliary pad disposed on an inner surface of the first substrate and electrically connected to the black matrix.

9. The liquid crystal display device of claim 8, further comprising a connection pattern in contact with a side surface and an outer surface of the second substrate,
   wherein the black matrix is electrically connected to the auxiliary pad through the connection pattern.

10. The liquid crystal display device of claim 9, wherein the liquid crystal panel further includes an overcoat layer on the color filter layer to expose a top surface of the black matrix, and
    wherein the connection pattern is in contact with the top surface and a side surface of the black matrix.

11. The liquid crystal display device of claim 8, wherein the liquid crystal panel further includes:
    a seal pattern between the first and second substrates, and
    a conductive seal pattern inside the seal pattern,
    wherein the black matrix is electrically connected to the auxiliary pad through the conductive seal pattern.

12. The liquid crystal display device of claim 11, wherein the liquid crystal panel further includes a shielding electrode on the black matrix, and
    wherein the conductive seal pattern is in contact with the shielding electrode.

13. The liquid crystal display device of claim 12, wherein the shielding electrode is between the black matrix and the color filter layer.

14. The liquid crystal display device of claim 12, wherein the shielding electrode is on the color filter layer.

15. The liquid crystal display device of claim 11,
    wherein the conductive seal pattern is in at least a portion of the non-display region.

16. The liquid crystal display device of claim 7, wherein the liquid crystal panel further includes:
a seal pattern between the first and second substrates,
a conductive seal pattern inside the seal pattern,
an overcoat layer on the color filter layer, and
a shielding electrode on the overcoat layer,
wherein the conductive seal pattern is in contact with the shielding electrode.

17. The liquid crystal display device of claim 1, wherein the organic buffer layer includes polyimide, polyamide, photosensitive acrylic polymer, and/or benzocyclobutene.

18. The liquid crystal display device of claim 1, wherein the organic buffer layer includes polyimide.

19. The liquid crystal display device of claim 1, wherein the organic buffer layer has a thickness in a range of from 20 Å to 50 μm.

20. The liquid crystal display device of claim 1,
wherein the organic buffer layer is placed in only the display region or in both the display and non-display regions.

21. The liquid crystal display device of claim 1, wherein the liquid crystal panel further includes:
a passivation layer between the thin film transistor and the pixel electrode, and
a touch line between the thin film transistor and the passivation layer.

22. The liquid crystal display device of claim 21, wherein the liquid crystal panel further includes:
a common electrode between the thin film transistor and the passivation layer and overlapped with the pixel electrode, and
a touch insulating layer between the common electrode and the touch line,
wherein the common electrode is between the touch insulating layer and the passivation layer.

23. The liquid crystal display device of claim 21, wherein the liquid crystal panel further includes:
a common electrode between the thin film transistor and the passivation layer and overlapped with the pixel electrode, and
a touch insulating layer between the common electrode and the touch line,
wherein the touch line is between the touch insulating layer and the passivation layer.

24. The liquid crystal display device of claim 21, wherein the liquid crystal panel further includes:
a common electrode between the thin film transistor and the passivation layer and overlapped with the pixel electrode, and
a touch insulating layer between the common electrode and the touch line.

25. A liquid crystal display device, comprising:
a liquid crystal panel including:
a first substrate,
a thin film transistor on the first substrate,
an organic buffer layer between the first substrate and the thin film transistor,
a pixel electrode connected to the thin film transistor,
a passivation layer between the thin film transistor and the pixel electrode,
a touch line between the thin film transistor and the passivation layer,
a common electrode between the thin film transistor and the passivation layer and overlapped with the pixel electrode,
a touch insulating layer between the common electrode and the touch line, wherein the common electrode is between the touch insulating layer and the passivation layer,
a second substrate,
a color filter layer on the second substrate, and
a liquid crystal layer between the first and second substrates; and
a backlight unit below the liquid crystal panel,
wherein the second substrate is between the backlight unit and the first substrate,
wherein the liquid crystal panel has a display region and a non-display region, and
wherein the organic buffer layer has a size equal to or larger than the display region.

26. A liquid crystal display device, comprising:
a liquid crystal panel including:
a first substrate,
a thin film transistor on the first substrate,
an organic buffer layer between the first substrate and the thin film transistor,
a pixel electrode connected to the thin film transistor,
a passivation layer between the thin film transistor and the pixel electrode,
a touch line between the thin film transistor and the passivation layer,
a common electrode between the thin film transistor and the passivation layer and overlapped with the pixel electrode,
a touch insulating layer between the common electrode and the touch line, wherein the touch line is between the touch insulating layer and the passivation layer,
a second substrate,
a color filter layer on the second substrate, and
a liquid crystal layer between the first and second substrates; and
a backlight unit below the liquid crystal panel,
wherein the second substrate is between the backlight unit and the first substrate,
wherein the liquid crystal panel has a display region and a non-display region, and
wherein the organic buffer layer has a size equal to or larger than the display region.

27. A liquid crystal display device, comprising:
a liquid crystal panel including:
a first substrate,
a thin film transistor on the first substrate,
an organic buffer layer between the first substrate and the thin film transistor,
a second substrate,
a color filter layer on the second substrate,
a black matrix on the second substrate, and
a liquid crystal layer between the first and second substrates; and
a backlight unit below the liquid crystal panel,
wherein the second substrate is between the backlight unit and the first substrate,
wherein the liquid crystal panel has a display region and a non-display region,
wherein the organic buffer layer has a size equal to or larger than the display region,
wherein the organic buffer layer is placed in only the display region,
wherein the organic buffer layer on the first substrate overlaps the black matrix and the color filter layer on the second substrate.

* * * * *